(12) United States Patent
Wang et al.

(10) Patent No.: US 7,884,160 B2
(45) Date of Patent: *Feb. 8, 2011

(54) NON-SPHERICAL NANOPARTICLES MADE FROM LIVING TRIBLOCK POLYMER CHAINS

(75) Inventors: Xiaorong Wang, Hudson, OH (US); Mindaugas Rackaitis, Massillon, OH (US); Victor J. Foltz, Akron, OH (US); Edward D. Kelley, Tallmadge, OH (US); Yuan-Yong Yan, Copley, OH (US)

(73) Assignee: Bridgestone Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/641,514

(22) Filed: Dec. 19, 2006

(65) Prior Publication Data

US 2007/0149649 A1    Jun. 28, 2007

Related U.S. Application Data

(60) Provisional application No. 60/751,602, filed on Dec. 19, 2005.

(51) Int. Cl.
  *B32B 27/00* (2006.01)
  *C08L 53/02* (2006.01)
  *C08L 21/00* (2006.01)

(52) U.S. Cl. .................. 525/271; 525/313; 525/314; 525/315; 525/316; 525/98; 525/99

(58) Field of Classification Search .............. 525/271, 525/313, 314, 315, 316, 98, 99
See application file for complete search history.

(56) References Cited

U.S. PATENT DOCUMENTS

| | | |
|---|---|---|
| 2,531,396 A | 11/1950 | Carter et al. |
| 3,598,884 A | 8/1971 | Wei et al. |
| 3,793,402 A | 2/1974 | Owens |
| 3,840,620 A | 10/1974 | Gallagher |
| 3,972,963 A | 8/1976 | Schwab et al. |
| 4,075,186 A | 2/1978 | Ambrose et al. |
| 4,233,409 A | 11/1980 | Bulkley |
| 4,247,434 A | 1/1981 | Lovelace |
| 4,248,986 A * | 2/1981 | Lal et al. ............ 525/99 |
| 4,326,008 A | 4/1982 | Rembaum |
| 4,386,125 A | 5/1983 | Shiraki et al. |
| 4,463,129 A | 7/1984 | Shinada et al. |
| 4,471,093 A | 9/1984 | Furukawa et al. |
| 4,543,403 A | 9/1985 | Isayama et al. |
| 4,598,105 A | 7/1986 | Weber et al. |
| 4,602,052 A | 7/1986 | Weber et al. |
| 4,659,790 A | 4/1987 | Shimozato et al. |
| 4,717,655 A | 1/1988 | Fulwyler |
| 4,725,522 A | 2/1988 | Breton et al. |
| 4,764,572 A | 8/1988 | Bean, Jr. |
| 4,773,521 A | 9/1988 | Chen |
| 4,774,189 A | 9/1988 | Schwartz |
| 4,788,254 A | 11/1988 | Kawakubo et al. |
| 4,829,130 A | 5/1989 | Licchelli et al. |
| 4,829,135 A | 5/1989 | Gunesin et al. |
| 4,837,274 A | 6/1989 | Kawakubo et al. |
| 4,837,401 A | 6/1989 | Hirose et al. |
| 4,861,131 A | 8/1989 | Bois et al. |
| 4,870,144 A | 9/1989 | Noda et al. |
| 4,871,814 A | 10/1989 | Gunesin et al. |
| 4,904,730 A | 2/1990 | Moore et al. |
| 4,904,732 A | 2/1990 | Iwahara et al. |
| 4,906,695 A | 3/1990 | Blizzard et al. |
| 4,920,160 A | 4/1990 | Chip et al. |
| 4,942,209 A | 7/1990 | Gunesin |
| 4,987,202 A * | 1/1991 | Zeigler ............... 528/10 |
| 5,036,138 A | 7/1991 | Stamhuis et al. |
| 5,066,729 A | 11/1991 | Stayer, Jr. et al. |
| 5,073,498 A | 12/1991 | Schwartz et al. |
| 5,075,377 A | 12/1991 | Kawakubo et al. |
| 5,120,379 A | 6/1992 | Noda et al. |
| 5,130,377 A | 7/1992 | Trepka et al. |
| 5,169,914 A | 12/1992 | Kaszas et al. |
| 5,194,300 A | 3/1993 | Cheung |
| 5,219,945 A | 6/1993 | Dicker et al. |

(Continued)

FOREIGN PATENT DOCUMENTS

CA    2127919    3/1995

(Continued)

OTHER PUBLICATIONS

Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).
Ishizu, Koji et al., "Preparation of core-shell type polymer microspheres from anionic block copolymers", Polymer, vol. 34, No. 18, pp. 3929-3933 (1993).
O'Reilly, Rachel K. et al., "Functionalization of Micelles and Shell Cross-linked Nanoparticles Using Click Chemistry", Chem. Mater., vol. 17, No. 24, pp. 5976-5988 [Nov. 24, 2005].
Saito, Reiko et al., "Core-Shell Type Polymer Microspheres Prepared From Poly(Styrene-b-Methacrylic Acid)—1. Synthesis of Microgel", Eur. Polym. J., vol. 27, No. 10, pp. 1153-1159 (1991).
Saito, Reiko et al., "Arm-number effect of core-shell type polymer microsphere: 1. Control of arm-number of microsphere", Polymer, vol. 35, No. 4, pp. 866-871 (1994).
Bohm, Georg et al., "Emerging materials: technology for new tires and other rubber products", Tire Technology International, 2006 (4 pp.).
Cui, Honggang et al., "Block Copolymer Assembly via Kinetic Control", Science, vol. 317, pp. 647-650 (Aug. 3, 2007).

(Continued)

*Primary Examiner*—Jeffrey C Mullis
(74) *Attorney, Agent, or Firm*—Meredith E. Hooker; Nathan Lewis

(57) ABSTRACT

The present invention provides polymeric nanoparticles comprising triblock and optionally diblock copolymer chains. The architecture of the polymeric nanoparticles may be controlled, resulting in nanoparticles having non-spherical shapes. The present invention also provides a method of preparing the polymeric nanoparticles and a rubber article such as a tire manufactured from a formulation comprising the polymer nanoparticles.

25 Claims, 10 Drawing Sheets

U.S. PATENT DOCUMENTS

| | | |
|---|---|---|
| 5,227,419 A | 7/1993 | Moczygemba et al. |
| 5,237,015 A | 8/1993 | Urban |
| 5,241,008 A | 8/1993 | Hall |
| 5,247,021 A | 9/1993 | Fujisawa et al. |
| 5,256,736 A | 10/1993 | Trepka et al. |
| 5,262,502 A | 11/1993 | Fujisawa et al. |
| 5,290,873 A | 3/1994 | Noda et al. |
| 5,290,875 A | 3/1994 | Moczygemba et al. |
| 5,290,878 A | 3/1994 | Yamamoto et al. |
| 5,296,547 A | 3/1994 | Nestegard et al. |
| 5,329,005 A | 7/1994 | Lawson et al. |
| 5,331,035 A | 7/1994 | Hall |
| 5,336,712 A | 8/1994 | Austgen, Jr. et al. |
| 5,362,794 A | 11/1994 | Inui et al. |
| 5,395,891 A | 3/1995 | Obrecht et al. |
| 5,395,902 A | 3/1995 | Hall |
| 5,399,628 A | 3/1995 | Moczygemba et al. |
| 5,399,629 A | 3/1995 | Coolbaugh et al. |
| 5,405,903 A | 4/1995 | Van Westrenen et al. |
| 5,421,866 A | 6/1995 | Stark-Kasley et al. |
| 5,436,298 A | 7/1995 | Moczygemba et al. |
| 5,438,103 A | 8/1995 | DePorter et al. |
| 5,447,990 A | 9/1995 | Noda et al. |
| 5,462,994 A | 10/1995 | Lo et al. |
| 5,514,734 A | 5/1996 | Maxfield et al. |
| 5,514,753 A | 5/1996 | Ozawa et al. |
| 5,521,309 A | 5/1996 | Antkowiak et al. |
| 5,525,639 A | 6/1996 | Keneko et al. |
| 5,527,870 A | 6/1996 | Maeda et al. |
| 5,530,052 A | 6/1996 | Takekoshi et al. |
| 5,580,925 A | 12/1996 | Iwahara et al. |
| 5,587,423 A | 12/1996 | Brandstetter et al. |
| 5,594,072 A | 1/1997 | Handlin, Jr. et al. |
| 5,614,579 A | 3/1997 | Roggeman et al. |
| 5,627,252 A | 5/1997 | De La Croi Habimana |
| 5,674,592 A | 10/1997 | Clark et al. |
| 5,686,528 A | 11/1997 | Wills et al. |
| 5,688,856 A | 11/1997 | Austgen, Jr. et al. |
| 5,707,439 A | 1/1998 | Takekoshi et al. |
| 5,728,791 A | 3/1998 | Tamai et al. |
| 5,733,975 A | 3/1998 | Aoyama et al. |
| 5,739,267 A | 4/1998 | Fujisawa et al. |
| 5,742,118 A | 4/1998 | Endo et al. |
| 5,747,152 A | 5/1998 | Oka et al. |
| 5,763,551 A | 6/1998 | Wunsch et al. |
| 5,773,521 A | 6/1998 | Hoxmeier et al. |
| 5,777,037 A | 7/1998 | Yamanaka et al. |
| 5,811,501 A | 9/1998 | Chiba et al. |
| 5,834,563 A | 11/1998 | Kimura et al. |
| 5,847,054 A | 12/1998 | McKee et al. |
| 5,849,847 A | 12/1998 | Quirk |
| 5,855,972 A | 1/1999 | Kaeding |
| 5,883,173 A | 3/1999 | Elspass et al. |
| 5,891,947 A | 4/1999 | Hall et al. |
| 5,905,116 A | 5/1999 | Wang et al. |
| 5,910,530 A | 6/1999 | Wang et al. |
| 5,955,537 A | 9/1999 | Steininger et al. |
| 5,986,010 A | 11/1999 | Clites et al. |
| 5,994,468 A | 11/1999 | Wang et al. |
| 6,011,116 A | 1/2000 | Aoyama et al. |
| 6,020,446 A | 2/2000 | Okamoto et al. |
| 6,025,416 A | 2/2000 | Proebster et al. |
| 6,025,445 A | 2/2000 | Chiba et al. |
| 6,060,549 A | 5/2000 | Li et al. |
| 6,060,559 A | 5/2000 | Feng et al. |
| 6,087,016 A | 7/2000 | Feeney et al. |
| 6,087,456 A | 7/2000 | Sakaguchi et al. |
| 6,106,953 A | 8/2000 | Zimmermann et al. |
| 6,117,932 A | 9/2000 | Hasegawa et al. |
| 6,121,379 A | 9/2000 | Yamanaka et al. |
| 6,127,488 A | 10/2000 | Obrecht et al. |
| 6,147,151 A | 11/2000 | Fukumoto et al. |
| 6,166,855 A | 12/2000 | Ikeyama et al. |
| 6,180,693 B1 | 1/2001 | Tang et al. |
| 6,191,217 B1 | 2/2001 | Wang et al. |
| 6,197,849 B1 | 3/2001 | Zilg et al. |
| 6,204,354 B1 | 3/2001 | Wang et al. |
| 6,207,263 B1 | 3/2001 | Takematsu et al. |
| 6,225,394 B1 | 5/2001 | Lan et al. |
| 6,252,014 B1 | 6/2001 | Knauss |
| 6,255,372 B1 | 7/2001 | Lin et al. |
| 6,268,451 B1 | 7/2001 | Faust et al. |
| 6,277,304 B1 | 8/2001 | Wei et al. |
| 6,348,546 B2 | 2/2002 | Hiiro et al. |
| 6,359,075 B1 | 3/2002 | Wollum et al. |
| 6,379,791 B1 | 4/2002 | Cernohous et al. |
| 6,383,500 B1 | 5/2002 | Wooley et al. |
| 6,395,829 B1 | 5/2002 | Miyamoto et al. |
| 6,420,486 B1 | 7/2002 | DePorter et al. |
| 6,437,050 B1 | 8/2002 | Krom et al. |
| 6,441,090 B1 | 8/2002 | Demirors et al. |
| 6,448,353 B1 | 9/2002 | Nelson et al. |
| 6,489,378 B1 | 12/2002 | Sosa et al. |
| 6,524,595 B1 | 2/2003 | Perrier et al. |
| 6,573,313 B2 | 6/2003 | Li et al. |
| 6,573,330 B1 | 6/2003 | Fujikake et al. |
| 6,598,645 B1 | 7/2003 | Larson |
| 6,649,702 B1 | 11/2003 | Rapoport et al. |
| 6,663,960 B1 | 12/2003 | Murakami et al. |
| 6,689,469 B2 | 2/2004 | Wang et al. |
| 6,693,746 B1 | 2/2004 | Nakamura et al. |
| 6,706,813 B2 | 3/2004 | Chiba et al. |
| 6,706,823 B2 | 3/2004 | Wang et al. |
| 6,727,311 B2 | 4/2004 | Ajbani et al. |
| 6,737,486 B2 | 5/2004 | Wang |
| 6,750,297 B2 | 6/2004 | Yeu et al. |
| 6,759,464 B2 | 7/2004 | Ajbani et al. |
| 6,774,185 B2 | 8/2004 | Lin et al. |
| 6,777,500 B2 | 8/2004 | Lean et al. |
| 6,780,937 B2 | 8/2004 | Castner |
| 6,835,781 B2 | 12/2004 | Kondou et al. |
| 6,858,665 B2 | 2/2005 | Larson |
| 6,861,462 B2 | 3/2005 | Parker et al. |
| 6,872,785 B2 | 3/2005 | Wang et al. |
| 6,875,818 B2 | 4/2005 | Wang |
| 6,908,958 B2 | 6/2005 | Maruyama et al. |
| 6,956,084 B2 | 10/2005 | Wang et al. |
| 7,056,840 B2 | 6/2006 | Miller et al. |
| 7,067,199 B2 * | 6/2006 | Hattori et al. ............... 428/611 |
| 7,071,246 B2 | 7/2006 | Xie et al. |
| 7,112,369 B2 | 9/2006 | Wang et al. |
| 7,179,864 B2 | 2/2007 | Wang |
| 7,193,004 B2 | 3/2007 | Weydert et al. |
| 7,205,370 B2 | 4/2007 | Wang et al. |
| 7,217,775 B2 | 5/2007 | Castner |
| 7,238,751 B2 | 7/2007 | Wang et al. |
| 7,244,783 B2 | 7/2007 | Lean et al. |
| 7,291,394 B2 | 11/2007 | Winkler et al. |
| 7,347,237 B2 | 3/2008 | Xie et al. |
| 7,408,005 B2 | 8/2008 | Zheng et al. |
| 2001/0053813 A1 | 12/2001 | Konno et al. |
| 2002/0007011 A1 | 1/2002 | Konno et al. |
| 2002/0045714 A1 | 4/2002 | Tomalia et al. |
| 2002/0095008 A1 | 7/2002 | Heinrich et al. |
| 2002/0144401 A1 | 10/2002 | Nogueroles Vines et al. |
| 2003/0004250 A1 | 1/2003 | Ajbani et al. |
| 2003/0032710 A1 | 2/2003 | Larson |
| 2003/0124353 A1 | 7/2003 | Wang et al. |
| 2003/0130401 A1 | 7/2003 | Lin et al. |
| 2003/0149185 A1 | 8/2003 | Wang et al. |
| 2003/0198810 A1 | 10/2003 | Wang et al. |
| 2003/0225190 A1 | 12/2003 | Borbely et al. |
| 2004/0033345 A1 | 2/2004 | Dubertret et al. |
| 2004/0059057 A1 | 3/2004 | Swisher et al. |

| | | | |
|---|---|---|---|
| 2004/0091546 A1 | 5/2004 | Johnson et al. | |
| 2004/0127603 A1 | 7/2004 | Lean et al. | |
| 2004/0143064 A1 | 7/2004 | Wang | |
| 2004/0198917 A1 | 10/2004 | Castner | |
| 2005/0101743 A1 | 5/2005 | Stacy et al. | |
| 2005/0182158 A1 | 8/2005 | Ziser et al. | |
| 2005/0192408 A1 | 9/2005 | Wang | |
| 2005/0197462 A1 | 9/2005 | Wang et al. | |
| 2005/0203248 A1 | 9/2005 | Zheng et al. | |
| 2005/0215693 A1 | 9/2005 | Wang et al. | |
| 2005/0228072 A1 | 10/2005 | Winkler et al. | |
| 2005/0228074 A1 | 10/2005 | Warren | |
| 2005/0282956 A1 | 12/2005 | Wang | |
| 2006/0084722 A1 | 4/2006 | Bohm | |
| 2006/0173115 A1 | 8/2006 | Fudemoto | |
| 2006/0173130 A1 | 8/2006 | Wang et al. | |
| 2006/0235128 A1 | 10/2006 | Wang | |
| 2007/0135579 A1 | 6/2007 | Obrecht et al. | |
| 2007/0142550 A1 | 6/2007 | Scurati | |
| 2007/0142559 A1 | 6/2007 | Wang et al. | |
| 2007/0161754 A1 | 7/2007 | Wang | |
| 2007/0185273 A1 | 8/2007 | Wang | |
| 2007/0196653 A1 | 8/2007 | Hall et al. | |
| 2008/0145660 A1 | 6/2008 | Wang et al. | |
| 2008/0149238 A1 | 6/2008 | Kleckner et al. | |
| 2008/0160305 A1 | 7/2008 | Warren | |
| 2008/0286374 A1 | 11/2008 | Wang et al. | |
| 2008/0305336 A1 | 12/2008 | Wang et al. | |
| 2009/0005491 A1 | 1/2009 | Warren et al. | |
| 2009/0048390 A1 | 2/2009 | Wang et al. | |
| 2009/0054554 A1 | 2/2009 | Wang et al. | |
| 2009/0270558 A1 | 10/2009 | Gandon-Pain et al. | |
| 2010/0004398 A1 | 1/2010 | Wang et al. | |
| 2010/0016472 A1 | 1/2010 | Wang et al. | |
| 2010/0016512 A1 | 1/2010 | Wang et al. | |

FOREIGN PATENT DOCUMENTS

| | | |
|---|---|---|
| DE | 3434983 | 4/1986 |
| DE | 4241538 | 6/1994 |
| EP | 0143500 | 6/1985 |
| EP | 0255170 | 2/1988 |
| EP | 0265142 | 4/1988 |
| EP | 0322905 | 7/1989 |
| EP | 0352042 | 1/1990 |
| EP | 0472344 | 2/1992 |
| EP | 0540942 | 5/1993 |
| EP | 0590491 | 4/1994 |
| EP | 0742268 | 11/1996 |
| EP | 1031605 | 8/2000 |
| EP | 1099728 | 5/2001 |
| EP | 1134251 | 9/2001 |
| EP | 1273616 | 6/2002 |
| EP | 1321489 | 6/2003 |
| EP | 1783168 | 5/2007 |
| FR | 2099645 | 3/1972 |
| JP | 01279943 | 11/1989 |
| JP | 2191619 | 7/1990 |
| JP | 2196893 | 8/1990 |
| JP | 05132605 | 5/1993 |
| JP | 06248017 | 9/1994 |
| JP | 7011043 | 1/1995 |
| JP | 08199062 | 8/1996 |
| JP | 2000-514791 | 11/2000 |
| JP | 2003-095640 | 4/2003 |
| JP | 2006-072283 | 3/2006 |
| JP | 2006-106596 | 4/2006 |
| JP | 2007-304409 | 11/2007 |
| WO | 91/04992 | 4/1991 |
| WO | 97/04029 | 2/1997 |
| WO | 98/53000 | 11/1998 |
| WO | 00/75226 | 12/2000 |
| WO | 01/87999 | 11/2001 |
| WO | 02/31002 | 4/2002 |
| WO | 0241987 | 5/2002 |
| WO | 02/081233 | 10/2002 |
| WO | 02/100936 | 12/2002 |
| WO | 03/032061 | 4/2003 |
| WO | 03/085040 | 10/2003 |
| WO | 2004/058874 | 7/2004 |
| WO | 2006/069793 | 7/2006 |
| WO | 2008/079276 | 7/2008 |
| WO | 2008/079807 | 7/2008 |
| WO | 2009/006434 | 1/2009 |

OTHER PUBLICATIONS

Edmonds, William F. et al., "Disk Micelles from Nonionic Coil- Coil Diblock Copolymers", Macromolecules, vol. 39, pp. 4526-4530 (May 28, 2006).

Pre-print article, Wang, Xiaorong et al., "PMSE 392- Manufacture and Commercial Uses of Polymeric Nanoparticles", Division of Polymeric Materials: Science and Engineering (Mar. 2006).

Wang, Xiaorong et al., "Manufacture and Commercial Uses of Polymeric Nanoparticles", Polymeric Materials: Science and Engineering, vol. 94, p. 659 (2006).

Wang, Xr. et al., "Fluctuations and critical phenomena of a filled elastomer under deformation", Europhysics Letters, vol. 75, No. 4, pp. 590-596 (Aug. 15, 2006).

Wang, Xiaorong et al., "Synthesis, Characterization, and Application of Novel Polymeric Nanoparticles", Macromolecules, 40, pp. 499-508 (2007).

Wang, Xiaorong et al., "Under microscopes the poly(styrene/butadiene) nanoparticles", Journal of Electron Microscopy, vol. 56, No. 6, pp. 209-216 (2007).

Wang, Xiaorong et al., "Heterogeneity of structural relaxation in a particle-suspension system", EPL, 79, 18001, pp. 1-5 (Jul. 2007).

Bridgestone Americas 2006 Presentation (14 pp.).

Kralik, M. et al., "Catalysis by metal nanoparticles supported on functional organic polymers", Journal of Molecular Catalysis A: Chemical, vol. 177, pp. 113-138 [2001].

Ma, H. et al., Reverse Atom Transfer Radical Polymerization of Methyl Methacrylate in Room-Temperature Ionic Liquids, J. Polym. Sci., A Polym. Chem., 41, pp. 143-151 (2003).

Wang, Xiaorong et al., U.S. Appl. No. 10/791,049, filed Mar. 2, 2004 entitled "Method Of Making Nano-Particles Of Selected Size Distribution".

Wang, Xiaorong et al., U.S. Appl. No. 10/791,177, filed Mar. 2, 2004 entitled "Rubber Composition Containing Functionalized Polymer Nanoparticles".

Wang, Xiaorong et al., U.S. Appl. No. 10/872,731, filed Jun. 21, 2004 entitled "Reversible Polymer/Metal Nano-Composites And Method For Manufacturing Same".

Wang, Xiaorong et al., U.S. Appl. No. 10/886,283, filed Jul. 6, 2004 entitled "Hydropobic Surfaces with Nanoparticles".

Wang, Xiaorong et al., U.S. Appl. No. 11/058,156, filed Feb. 15, 2005 entitled "Multi-Layer Nano-Particle Preparation And Applications".

Wang, Xiaorong et al., U.S. Appl. No. 11/104,759, filed Apr. 13, 2005 entitled "Nano-Particle Preparation And Applications".

Bohm, Georg G.A. et al., U.S. Appl. No. 11/117,981, filed Apr. 29, 2005 entitled "Self Assembly Of Molecules To Form Nano-Particle".

Wang, Xiaorong et al., U.S. Appl. No. 11/305,279, filed Dec. 16, 2005 entitled "Combined Use Of Liquid Polymer And Polymeric Nanoparticles For Rubber Applications".

Wang, Xiaorong et al., U.S. Appl. No. 11/344,861, filed Feb. 1, 2006 entitled "Nano-Composite And Compositions Therefrom".

Wang, Xiaorong et al., U.S. Appl. No. 11/642,796, filed Dec. 20, 2006 entitled "Hollow Nano-Particles And Method Thereof".

Wang, Xiaorong et al., U.S. Appl. No. 11/764,607, filed Jun. 18, 2007 entitled "Multi-Layer Nano-Particle Preparation and Applications".

Warren, Sandra, U.S. Appl. No. 11/771,659, filed Jun. 29, 2007 entitled "One-Pot Synthesis Of Nanoparticles And Liquid Polymer For Rubber Applications".

Wang, Xiaorong et al., U.S. Appl. No. 11/941,128, filed Nov. 16, 2007 entitled "Nano-Particle Preparation And Applications".

Wang, Xiaorong et al., U.S. Appl. No. 11/954,268, filed Dec. 12, 2007 entitled "Nanoporous Polymeric Material And Preparation Method".

Wang, Xiaorong et al., U.S. Appl. No. 12/047,896, filed Mar. 13, 2008 entitled "Reversible Polymer/Metal Nano-Composites And Method For Manufacturing Same".

Wang, Xiaorong et al., U.S. Appl. No. 12/184,895, filed Aug. 1, 2008 entitled "Disk-Like Nanoparticles".

Akashi, Mitsuru et al., "Synthesis and Polymerization of a Styryl Terminated Oligovinylpyrrolidone Macromonomer", Die Angewandte Makromolekulare Chemie, 132, pp. 81-89 (1985).

Alexandridis, Paschalis et al., "Amphiphilic Block Copolymers: Self-Assembly and Applications", Elsevier Science B.V., pp. 1-435 (2000).

Allgaier, Jurgen et al., "Synthesis and Micellar Properties of PS-PI Block Copolymers of Different Architecture", ACS Polym. Prepr. (Div Polym. Chem.), vol. 37, No. 2, pp. 670-671 (1996).

Antonietti, Markus et al., "Determination of the Micelle Architecture of Polystyrene/Poly(4-vinylpyridine) Block Copolymers in Dilute Solution", Macromolecules, 27, pp. 3276-3281 (1994).

Antonietti, Markus et al., "Novel Amphiphilic Block Copolymers by Polymer Reactions and Their Use for Solubilization of Metal Salts and Metal Colloids", Macromolecules, 29, pp. 3800-3806 (1996).

Bahadur, Pratap, "Block copolymers- Their microdomain formation (in solid state) and surfactant behaviour (in solution)", Current Science, vol. 80, No. 8, pp. 1002-1007, Apr. 25, 2001.

Batzilla, Thomas et al., "Formation of intra- and intermolecular crosslinks in the radical crosslinking of poly(4-vinylstyrene)", Makromol. Chem., Rapid Commun. 8, pp. 261-268 (1987).

Bauer, B.J. et al., "Synthesis and Dilute-Solution Behavior of Model Star-Branched Polymers", Rubber Chemistry and Technology, vol. 51, pp. 406-436 (1978).

Berger, G. et al., "Mutual Termination of Anionic and Cationic 'Living' Polymers", Polymer Letters, vol. 4, pp. 183-186 (1966).

Borukhov, Itamar et al., "Enthalpic Stabilization of Brush-Coated Particles in a Polymer Melt", Macromolecules, vol. 35, pp. 5171-5182 (2002).

Bradley, John S., "The Chemistry of Transition Metal Colloids", Clusters and Colloids: From Theory to Applications, Chapter 6, Weinheim, VCH, pp. 459-544 (1994).

Braun, Hartmut et al., "Enthalpic interaction of diblock copolymers with immiscible polymer blend components", Polymer Bulletin, vol. 32, pp. 241-248 (1994).

Bronstein, Lyudmila M. et al., "Synthesis of Pd-, Pt-, and Rh-containing polymers derived from polystyrene-polybutadiene block copolymers; micellization of diblock copolymers due to complexation", Macromol. Chem. Phys., 199, pp. 1357-1363 (1998).

Brown, H.R. et al., "Communications to the Editor: Enthalpy-Driven Swelling of a Polymer Brush", Macromolecules, vol. 23, pp. 3383-3385 (1990).

Cahn, John W., "Phase Separation by Spinodal Decomposition in Isotropic Systems", The Journal of Chemical Physics, vol. 42, No. 1, pp. 93-99 (Jan. 1, 1965).

Calderara, Frederic et al., "Synthesis of chromophore-labelled polystyrene/poly(ethylene oxide) diblock copolymers", Makromol. Chem., 194, pp. 1411-1420 (1993).

Canham et al., "Formation of Worm-like Micelles from a Polystyrene-Polybutadiene-Polystyrene Block Copolymer in Ethyl Acetate", J.C.S. Faraday I, 76, pp. 1857-1867 (1980).

Chen, Ming-Qing et al., "Graft Copolymers Having Hydrophobic Backbone and Hydrophilic Branches. XXIII. Particle Size Control of Poly(ethylene glycol)- Coated Polystyrene Nanoparticles Prepared by Macromonomer Method", Journal of Polymer Science: Part A: Polymer Chemistry, vol. 37, pp. 2155-2166 (1999).

Chen, Ming-Qing et al., "Nanosphere Formation in Copolymerization of Methyl Methacrylate with Poly(ethylene glycol) Macromonomers", Journal of Polymer Science: Part A: Polymer Chemistry, vol. 38, pp. 1811-1817 (2000).

Chen, Wei et al., "Ultrahydrophobic and Ultrayophobic Surfaces: Some Comments and Examples", The ACS Journal of Surfaces and Colloids, vol. 15, No. 10, pp. 3395-3399 (May 11, 1999).

Coleman, Lester E. et al., "Reaction of Primary Aliphatic Amines with Maleic Anhydride", J. Org,. Chem., 24, 185, pp. 135-136 (1959).

Cosgrove, T . et al., Macromolecules, 26, pp. 4363-4367 (1993).

Coulson, S.R. et al., "Super-Repellent Composite Fluoropolymer Surfaces", The Journal of Physical Chemistry B, vol. 104, No. 37, pp. 8836-8840 (Sep. 21, 2000).

Dieterich, W. et al., "Non-Debye Relaxations in Disordered Ionic Solids", Chem. Chys., 284, pp. 439-467 (2002).

Ege, Seyhan, Organic Chemistry Structure and Reactivity, 3rd Edition, p. 959 (1994).

Eisenberg, Adi, "Thermodynamics, Kinetics, and Mechanisms of the Formation of Multiple Block Copolymer Morphologies", Polymer Preprints, vol. 41, No. 2, pp. 1515-1516 (2000).

Erbil, H. Yildirim et al., "Transformation of a Simple Plastic into a Superhydrophobic Surface", Science, vol. 299, pp. 1377-1380 (Feb. 28, 2003).

Erhardt, Rainer et al., Macromolecules, vol. 34, No. 4, pp. 1069-1075 (2001).

Eschwey, Helmut et al., "Preparation and Some Properties of Star-Shaped Polymers with more than Hundred Side Chains", Die Makromolekulare Chemie 173, pp. 235-239 (1973).

Eschwey, Helmut et al., "Star polymers from styrene and divinylbenzene", Polymer, vol. 16, pp. 180-184 (Mar. 1975).

Fendler, Janos H., "Nanoparticles and Nanostructured Films: Preparation, Characterization and Applications", Wiley-VCH, pp. 1-468 (1998).

Ferreira, Paula G. et al., "Scaling Law for Entropic Effects at Interfaces between Grafted Layers and Polymer Melts", Macromolecules, vol. 31, pp. 3994-4003 (1998).

Garcia, Carlos B. et al., "Self-Assembly Approach toward Magnetic Silica-Type Nanoparticles of Different Shapes from Reverse Block Copolymer Mesophases", J. Am. Chem. Soc., vol. 125, pp. 13310-13311 (2003).

Gay, C., "Wetting of a Polymer Brush by a Chemically Identical Polymer Melt", Macromolecules, vol. 30, pp. 5939-5943 (1997).

Gilman, J.W. et al., "Recent Advances in Flame Retardant Polymer Nanocomposites", pp. 273-283.

Giannelis, E.P. "Polymer Layered Silicate Nanocomposites", Advanced Materials, vol. 8, No. 1, pp. 29-35 (Jan. 1, 1996).

Greenwood, N.N. et al., "Chemistry of the Elements", Pergaroen Press, New York, pp. 1126-1127 (1984).

Guo, Andrew et al., "Star Polymers and Nanospheres from Cross-Linkable Diblock Copolymers", Macromolecules, vol. 29, pp. 2487-2493, Jan. 17, 1996.

Halperin, A., "Polymeric Micelles: A Star Model", Macromolecules, vol. 20, pp. 2943-2946 (1987).

Hamley, Ian W., "The Physics of Block Copolymers", Oxford Science Publication: Oxford, Chapters 3 and 4, pp. 131-265, (1998).

Hardacre, C. et al., "Structure of molten 1,3-dimethylimidazolium chloride using neutron diffraction", J. Chem. Physics, 118(1), pp. 273-278 (2003).

Hasegawa, Ryuichi et al., "Optimum Graft Density for Dispersing Particles in Polymer Melts", Macromolecules, vol. 29, pp. 6656-6662 (1996).

Hay, J.N. et al., "A Review of Nanocomposites" (2000).

Hoffman, B. et al., "Rheology of Nanocomposites Based on Layered Silicates and Polyamide-12", Colloid Polm. Sci.., 278, pp. 629-636 (2000).

Ishizu, Koji et al., "Synthesis of Star Polymer with Nucleus of Microgel", Polymer Journal, vol. 12, No. 6, pp. 399-404 (1980).

Ishizu, Koji et al., "Core-Shell Type Polymer Microspheres Prepared from Block Copolymers", Journal of Polymer Science: Part C: Polymer Letters, vol. 26, pp. 281-286, 1988.

Ishizu, Koji, "Synthesis and Structural Ordering of Core-Shell Polymer Microspheres", Prog. Polym. Sci., vol. 23, pp. 1383-1408, 1998.

Ishizu, Koji, "Star Polymers by Immobilizing Functional Block Copolymers", Star and Hyperbranched Polymers, ISBN 0-8247, pp. 1986-1987 (1999).

Ishizu, Koji, "Structural Ordering of Core Crosslinked Nanoparticles and Architecture of Polymeric Superstructures", ACS Polym. Prepr. (Div Polym Chem) vol. 40, No. 1, pp. 456-457 (1999).

Jensen, M. et al., "EXAFS Investigations of the Mechanism of Facilitated Ion Transfer into a Room-Temperature Ionic Liquid", Jacs, 124, pp. 10664-10665 (2002).

Kim, Woo-Sik et al., "Synthesis and Photocrosslinking of Maleimide-Type Polymers", Macromol. Rapid Commun., 17, 835, pp. 835-841 (1996).

Kraus, Gerard, "Mechanical Losses in Carbon-Black-Filled Rubbers", Journal of Applied Polymer Science: Applied Polymer Symposium, vol. 39, pp. 75-92 (1984).

Krishnamoorti, R. et al., "Rheology of End-Tethered Polymer Layered Silicate Nanocomposites", Macromol., 30, pp. 4097-4102 (1997).

Lagaly, Gehard, "Kink-Block and Gauche-Block Structures of Bimolecular Films", Chem. Int. Ed. Engl., vol. 15, No. 10, pp. 575-586 (1976).

Lawson, David F. et al., "Preparation and Characterization of Heterophase Blends of Polycaprolactam and Hydrogenated Polydienes", Central Research Journal of Applied Polymer Science, vol. 39, pp. 2331-2351 (1990).

Lee, Wen-Fu et al., "Polysulfobetaines and Corresponding Cationic Polymers. IV. Synthesis and Aqueous Solution Properties of Cationic Poly (MIQSDMAPM)", J. Appl. Pol. Sci., vol. 59, pp. 599-608 (1996).

Ligoure, Christian, "Adhesion between a Polymer Brush and an Elastomer: A Self-Consistent Mean Field Model", Macromolecules, vol. 29, pp. 5459-5468 (1996).

Liu, Guojun et al., "Diblock Copolymer Nanofibers", Macromolecules, 29, pp. 5508-5510 (1996).

Liu, T. et al., "Formation of Amphiphilic Block Copolymer Micelles in Nonaqueous Solution", Amphiphilic Block Copolymers: Self-Assembly and Applications, Elsevier Science B.V., pp. 115-149 (2000).

Ma, H. et al., "Reverse Atom Transfer Radical Polymerization of Methyl Methacrylate in Room-Temperature Inoic Liqquids", J. Polym. Sci., A. Polym. Chem., 41, pp. 143-151 (2003).

Ma, Qinggao et al., "Entirely Hydrophilic Shell Cross-Linked Knedel-Like (SCK) Nanoparticles", Polymer Preprints, vol. 41, No. 2, pp. 1571-1572 (2000).

Mandema et al., "Association of Block Copolymers in Selective Solvents, 1 Measurements on Hydrogenated Poly(styrene-isoprene) in Decane and in trans-Decalin", Makromol. Chem. 180, pp. 1521-1538 (1979).

Matsen, M.W., "Phase Behavior of Block Copolymer/Homopolymer Blends", Macromolecules, vol. 28, pp. 5765-5773 (1995).

Matsumoto, A. et al., "Synthesis, Thermal Properties and Gas Permeability of Poly (N-n-alkylmaleimide)s", Polymer Journal, vol. 23, No. 3, pp. 201-209 (1991).

Mayer, A.B.R. et al., "Transition metal nanoparticles protected by amphiphilic block copolymers as tailored catalyst systems", Colloid Polym. Sci., 275, pp. 333-340 (1997).

Mendizabal, E. et al., "Functionalized Core-Shell Polymers Prepared by Microemulsion Polymerization", Dept. of Ingenieria Quimica, Unviv. De Guadalajara, MX, 477, ANTE 97, pp. 1733-1737.

Mi, Yongli et al., "Glass transition of nano-sized single chain globules", Polymer 43, Elsevier Science Ltd., pp. 6701-6705 (2002).

Milner, S.T. et al., "Theory of the Grafted Polymer Brush", Macromolecules, vol. 21, pp. 2610-2619 (1988).

Milner, S.T. et al., "End-Confined Polymers: Corrections to the Newtonian Limit", Macromolecules, vol. 22, pp. 489-490 (1989).

Moller, M. et al., Macromol. Symp., 117, pp. 207-218 (1997).

Mossmer, S. et al., Macromol. 33, pp. 4791-4798 (2000).

Nace, Vaughn M., "Nonionic Surfactants: Polyoxyalkylene Block Copolymers", Surfactant Science Series, vol. 60, pp. 1-266 (1996).

Newkome G.R, "Dendrimers and Dendrons, Concept, Synthesis, Application", pp. 45, 191-310 (2001).

Noolandi, Jaan et al., "Theory of Block Copolymer Micelles in Solution", Macromolecules, vol. 16, pp. 1443-1448 (1983).

Okay, Oguz et al., "Steric stabilization of reactive microgels from 1,4-divinylbenzene", Makromol. Chem., Rapid Commun., vol. 11, pp. 583-587 (1990).

Okay, Oguz et al., "Anionic Dispersion Polymerization of 1,4-Divinylbenzene", Macromolecules, 23, pp. 2623-2628 (1990).

Oranli, Levent et al., "Hydrodynamic studies on micellar solutions of styrene-butadiene block copolymers in selective solvents", Can. J. Chem., vol. 63, pp. 2691-2696, 1985.

Piirma, Irja, "Polymeric Surfactants", Surfactant Science Series, vol. 42, pp. 1-289 (1992).

Pispas, S. et al., "Effect of Architecture on the Micellization Properties of Block Copolymers: $A_2B$ Miktoarm Stars vs AB Diblocks", Macromolecules, vol. 33, pp. 1741-1746, Feb. 17, 2000.

Price, Colin, "Colloidal Properties of Block Copolymers", Applied Science Publishers Ltd., Chapter 2, pp. 39-80 (1982).

Quirk, R.P. et al., Macromolecules, 34, pp. 1192-1197 (2001).

Rager, Timo et al., "Micelle formation of poly(acrylic acid)- block-poly(methyl methacrylate) block copolymers in mixtures of water with organic solvents", Macromol. Chem. Phys., 200, No. 7, pp. 1672-1680 (1999).

Rein, David H. et al., "Kinetics of arm-first star polymers formation in a non-polar solvent", Macromol. Chem. Phys., vol. 199, pp. 569-574 (1998).

Rempp, Paul et al., "Grafting and Branching of Polymers", Pure Appl. Chem., vol. 30, pp. 229-238 (1972).

Ren, J., "Linear Viscoelasticity of Disordered Polystyrene-Polyisoprene ... Layered-Silicate Nanocomposites", Macromol., pp. 3739-3746 (2000).

Riess, Gerard et al., "Block Copolymers", Encyclopedia of Polymer Science and Engineering, vol. 2, pp. 324-434 (1985).

Riess, Gerard, "Micellization of block copolymers", Prog. Polym. Sci., vol. 28, pp. 1107-1170 (Jan. 16, 2003).

Saito, Reiko et al., "Synthesis of microspheres with 'hairy-ball' structures from poly (styrene-b-2-vinyl pyridine) diblock copolymers", Polymer, vol. 33, No. 5, pp. 1073-1077 (1992).

Saito, Reiko et al., "Synthesis of Microspheres with Microphase-Separated Shells", Journal of Polymer Science: Part A: Polymer Chemistry, vol. 38, pp. 2091-2097 (2000).

Semenov, A.N., "Theory of Diblock-Copolymer Segregation to the Interface and Free Surface of a Homopolymer Layer", Macromolecules, vol. 25, pp. 4967-4977 (1992).

Semenov, A.N., "Phase Equilibria in Block Copolymer-Homopolymer Mixtures", Macromolecules, vol. 26, pp. 2273-2281 (1993).

Serizawa, Takeshi et al., "Transmission Electron Microscopic Study of Cross-Sectional Morphologies of Core-Corona Polymeric Nanospheres", Macromolecules, 33, pp. 1759-1764 (2000).

Shull, Kenneth R., "End-Adsorbed Polymer Brushes in High- and Low-Molecular-Weight Matrices", Macromolecules, vol. 29, pp. 2659-2666 (1996).

Stepanek, Miroslav et al. "Time-Dependent Behavior of Block Polyelectrolyte Micelles in Aqueous Media Studied by Potentiometric Titrations, QELS and Fluoroetry", Langmuir, vol. 16, No. 6, pp. 2502-2507 (2000).

Thurmond II, K. Bruce et al., "Water-Soluble Knedel-like Structures: The Preparation of Shell-Cross-Linked Small Particles", J. Am. Chem. Soc., vol. 118, pp. 7239-7240 (1996).

Thurmond II, K. Bruce et al., "The Study of Shell Cross-Linked Knedels (SCK), Formation and Application", ACS Polym. Prepr. (Div Polym. Chem.), vol. 38, No. 1, pp. 62-63 (1997).

Thurmond, K. Bruce et al., "Shell cross-linked polymer micelles: stabilized assemblies with great versatility and potential", Colloids and Surfaces B: Biointerfaces, vol. 16, pp. 45-54 (1999).

Tiyapiboonchaiya, C. et la., "Polymer-m-Ionic-Liquid Electrolytes", Micromol. Chem. Phys., 203, pp. 1906-1911 (2002).

Tomalia, Donald A. et al., Dendritic Macromolecules: Synthesis of Starburst Dendrimers, , Macromolecules, vol. 19, No. 9, pp. 2466-2468 (1986).

Tsitsilianis, Constantinos et al., Makromol. Chem. 191, pp. 2319-2328 (1990).

Tuzar et al ., "Anomalous Behaviour of Solutions of Styrene-Butadiene Block Copolymers in Some Solvents", Makromol. Chem. 178, pp. 22743-22746, (1977).

Tuzar, Zdenek et al., "Micelles of Block and Graft Copolymers in Solutions", Surface and Colloid Science, vol. 15, Chapter 1, pp. 1-83 (1993).

Utiyama et al., "Light-Scattering Studies of a Polystyrene-Poly(methyl methacrylate) Two-Blcok Copolymer in Mixed Solvents", Macromolecules, vol. 7, No. 4, (Jul.-Aug. 1974).

Vamvakaki, M. et al., "Synthesis of novel block and statistical methacrylate-based ionomers containing acidic, basic or betaine residues", Polymer, vol. 39, No. 11, pp. 2331-2337 (1998).

van der Maarel, J.R.C. et al., "Salt-Induced Contraction of Polyelectrolyte Diblock Copolymer Micelles", Langmuir, vol. 16, No. 19, pp. 7510-7519 (2000).

Vermeesch, I. et al., "Chemical Modification of Poly (styrene-co-maleic anhydride) with Primary N-Alkylamines by Reactive Extrusion", J. Applied Polym. Sci., vol. 53, pp. 1365-1373 (1994).

Wang, Xiaorong et al., "Chain conformation in two-dimensional dense state", Journal of Chemical Physics, vol. 121, No. 16, pp. 8158-8162 (Oct. 22, 2004).

Wang, Xiaorong et al., "Strain-induced nonlinearity of filled rubbers", Physical Review E 72, 031406, pp. 1-9 (Sep. 20, 2005).

Webber, Stephen E. et al., "Solvents and Self-Organization of Polymers", NATO ASI Series, Series E: Applied Sciences, vol. 327, pp. 1-509 (1996).

Whitmore, Mark Douglas et al., "Theory of Micelle Formation in Block Copolymer-Homopolymer Blends", Macromolecules, vol. 18, pp. 657-665 (1985).

Wijmans, C.M. et al., "Effect of Free Polymer on the Structure of a Polymer Brush and Interaction between Two Polymer Brushes", Macromolecules, vol. 27, pp. 3238-3248 (1994).

Wilkes, J.S. et al., "Dialkylimidazolium Chloroaluminate Melts: A New Class of Room-Temperature Ionic Liquids for Electrochemistry, Spectroscopy, and Synthesis", Inorg. Chem., 21, pp. 1263-1264 (1982).

Wilson, D.J. et al., "Photochemical Stabilization of Block Copolymer Micelles", Eur. Polym. J., vol. 24, No. 7, pp. 617-621, 1988.

Witten, T.A. et al., "Stress Relaxation in the Lamellar Copolymer Mesophase", Macromolecules, vol. 23, pp. 824-829 (1990).

Wooley, Karen L, "From Dendrimers to Knedel-like Structures", Chem. Eur. J., 3, No. 9, pp. 1397-1399 (1997).

Wooley, Karen L, "Shell Crosslinked Polymer Assemblies: Nanoscale Constructs Inspired from Biological Systems", Journal of Polymer Science: Part A: Polymer Chemistry, vol. 38, pp. 1397-1407 (2000).

Worsfold, Denis J. et al., "Preparation et caracterisation de polymeres-modele a structure en etoile, par copolymerisation sequencee anionique", Canadian Journal of Chemistry, vol. 47, pp. 3379-3385 (Mar. 20, 1969).

Worsfold, D.J., "Anionic Copolymerization of Styrene with p-Divinylbenzene", Macromolecules, vol. 3, No. 5, pp. 514-517 (Sep.-Oct. 1970).

Zheng, Lei et al., "Polystyrene Nanoparticles with Anionically Polymerized Polybutadiene Brushes", Macromolecules, 37, pp. 9954-9962 (2004).

Zilliox, Jean-Georges et al., "Preparation de Macromolecules a Structure en Etoile, par Copolymerisation Anionique", J. Polymer Sci.: Part C, No. 22, pp. 145-156 (1968).

"Quaternary Ammonium Compounds", Encyclopedia of Chem Tech., 4th Ed., vol. 20, pp. 739-767 (1996).

"Simultaneous TA and MS Analysis of Alternating Styrene-Malei Anhydride and Styrene-Maleimide Copolymers", Thermochim. Acta, 277, 14 (1996).

"Synthesis, Functionalization and Surface Treatment of Nanoparticles", edited by Baraton M-I, ASP (Am. Sci. Pub.), pp. 51-52, 174-208 (2003).

Vulcanization Agents and Auxiliary Materials, Kirk-Othmer, Encyclopedia of Chemical Technology, 3rd Ed., Wiley Interscience, NY, 1982, vol. 22, pp. 390-403.

Oct. 20, 2005 Office Action from U.S. Appl. No. 11/104,759, filed Apr. 13, 2005 (12 pp.).

Aug. 21, 2006 Final Office Action from U.S. Appl. No. 11/104,759 filed Apr. 13, 2005 (14 pp.).

Dec. 22, 2006 Advisory Action from U.S. Appl. No. 11/104,759, filed Apr. 13, 2005 (3 pp.).

May 16, 2007 Office Action from U.S. Appl. No. 11/104,759, filed Apr. 13, 2005 (9 pp.).

Oct. 30, 2007 Final Office Action from U.S. Appl. No. 11/104,759, filed Apr. 13, 2005 (11 pp.).

Harlan, Robert D., Final Office Action dated Dec. 10, 2008 from U.S. Appl. No. 10/791,177 (8 pp.).

Cain, Edward J., Final Office Action dated Dec. 9, 2008 from U.S. Appl. No. 11/642,795 (6 pp.).

Mulcahy, Peter D., Restriction/Election Office Action dated Dec. 11, 2008 from U.S. Appl. No. 11/642,802 (7 pp.).

Lipman, Bernard, Notice of Allowance dated Jan. 14, 2009 from U.S. Appl. No. 11/058,156 (5 pp.).

Harlan, Robert D., Office Action dated Jan. 9, 2009 from U.S. Appl. No. 11/117,981 (6 pp.).

Cain, Edward J., Notice of Allowance dated Dec. 31, 2008 from U.S. Appl. No. 11/642,124 (5 pp.).

Lipman, Bernard, Notice of Allowance dated Jan. 27, 2009 from U.S. Appl. No. 11/764,607 (4 pp.).

Johnson, Edward M., International Search Report dated Dec. 12, 2008 from PCT Application No. PCT/US07/74611 (5 pp.).

Wang, Xiaorong et al., U.S. Appl. No. 12/374,883, filed Jul. 27, 2007, entitled "Polymeric Core-Shell Nanoparticles with Interphase Region".

Haider, Saira Bano, Mar. 3, 2009 Advisory Action from U.S. Appl. No. 11/104,759 (3 pp.).

Mullis, Jeffrey C., Mar. 11, 2009 Office Action from U.S. Appl. No. 10/791,049 (9 pp.).

Harlan, Robert D., Mar. 11, 2009 Notice of Allowance from U.S. Appl. No. 10/791,177 (8 pp.).

Sykes, Altrev C., Mar. 20, 2009 Office Action from U.S. Appl. No. 11/818,023 (27 pp.).

Pak, Hannah J., Apr. 2, 2009 Office Action from U.S. Appl. No. 11/941,128 (9 pp.).

Sakurai, Ryo et al., "68.2: Color and Flexible Electronic Paper Display using QR-LPD Technology", SID 06 Digest, pp. 1922-1925 (2006).

Asinovsky, Olga, Jun. 20, 2006 Office Action from U.S. Appl. No. 10/791,049, filed Mar. 2, 2004 (11 pp.).

Asinovsky, Olga, Dec. 22, 2006 Office Action from U.S. Appl. No. 10/791,049, filed Mar. 2, 2004 (11 pp.).

Asinovsky, Olga, Jun. 7, 2007 Office Action from U.S. Appl. No. 10/791,049, filed Mar. 2, 2004 (11 pp.).

Asinovsky, Olga, Nov. 28, 2007 Office Action from U.S. Appl. No. 10/791,049, filed Mar. 2, 2004 (9 pp.).

Asinovsky, Olga, May 21, 2008 Office Action from U.S. Appl. No. 10/791,049, filed Mar. 2, 2004 (11 pp.).

Asinovsky, Olga, Sep. 11, 2008 Office Action from U.S. Appl. No. 10/791,049, filed Mar. 2, 2004 (12 pp.).

Ronesi, Vickey M., Jan. 8, 2007 Office Action from U.S. Appl. No. 10/791,177, filed Mar. 2, 2004 (5 pp.).

Harlan, Robert D., May 3, 2007 Office Action from U.S. Appl. No. 10/791,177, filed Mar. 2, 2004 (6 pp.).

Harlan, Robert D., Oct. 18, 2007 Office Action from U.S. Appl. No. 10/791,177, filed Mar. 2, 2004 (6 pp.).

Harlan, Robert D., May 28, 2008 Office Action from U.S. Appl. No. 10/791,177, filed Mar. 2, 2004 (8 pp.).

Kiliman, Leszek B., Sep. 9, 2005 Office Action from U.S. Appl. No. 10/817,995, filed Apr. 5, 2004 (7 pp.).

Kiliman, Leszek B., Mar. 23, 2006 Office Action from U.S. Appl. No. 10/817,995, filed Apr. 5, 2004 (7 pp.).

Kiliman, Leszek B., Dec. 13, 2006 Office Action from U.S. Appl. No. 10/817,995, filed Apr. 5, 2004 (6 pp.).

Kiliman, Leszek B., Sep. 5, 2008 Office Action from U.S. Appl. No. 10/817,995, filed Apr. 5, 2004 (5 pp.).

Wyrozebski Lee, Katarzyna I., Dec. 19, 2006 Office Action from U.S. Appl. No. 10/872,731, filed Jun. 21, 2004 (6 pp.).

Wyrozebski Lee, Katarzyna I., Mar. 7, 2007 Office Action from U.S. Appl. No. 10/872,731, filed Jun. 21, 2004 (13 pp.).

Wyrozebski Lee, Katarzyna I., Sep. 14, 2007 Office Action from U.S. Appl. No. 10/872,731, filed Jun. 21, 2004 (9 pp.).

Chevalier, Alicia Ann, Sep. 6, 2006 Office Action from U.S. Appl. No. 10/886,283, filed Jul. 6, 2004 (5 pp.).

Chevalier, Alicia Ann, Jan. 4, 2007 Office Action from U.S. Appl. No. 10/886,283, filed Jul. 6, 2004 (8 pp.).

Chevalier, Alicia Ann, Jul. 2, 2007 Office Action from U.S. Appl. No. 10/886,283, filed Jul. 6, 2004 (8 pp.).
Chevalier, Alicia Ann, Jan. 4, 2008 Office Action from U.S. Appl. No. 10/886,283, filed Jul. 6, 2004 (8 pp.).
Mullis, Jeffrey C., Oct. 31, 2006 Office Action from U.S. Appl. No. 11/050,115, filed Feb. 3, 2005 (6 pp.).
Mullis, Jeffrey C., Mar. 24, 2008 Office Action from U.S. Appl. No. 11/050,115, filed Feb. 3, 2005 (10 pp.).
Mullis, Jeffrey C., Aug. 21, 2008 Office Action from U.S. Appl. No. 11/050,115, filed Feb. 3, 2005 (7 pp.).
Lipman, Bernard., Sep. 29, 2006 Office Action from U.S. Appl. No. 11/058,156, filed Feb. 15, 2005 (5 pp.).
Raza, Saira B., Oct. 20, 2005 Office Action from U.S. Appl. No. 11/104,759, filed Apr. 13, 2005 (10 pp.).
Raza, Saira B., Aug. 21, 2006 Office Action from U.S. Appl. No. 11/104,759, filed Apr. 13, 2005 (6 pp.).
Haider, Saira Bano, May 16, 2007 Office Action from U.S. Appl. No. 11/104,759, filed Apr. 13, 2005 (9 pp.).
Haider, Saira Bano, Oct. 30, 2007 Office Action from U.S. Appl. No. 11/104,759, filed Apr. 13, 2005 (9 pp.).
Haider, Saira Bano, Jun. 12, 2008 Office Action from U.S. Appl. No. 11/104,759, filed Apr. 13, 2005 (10 pp.).
Harlan, Robert D., Nov. 7, 2005 Office Action from U.S. Appl. No. 11/117,981, filed Apr. 29, 2005 (7 pp.).
Harlan, Robert D., Jul. 20, 2006 Office Action from U.S. Appl. No. 11/117,981, filed Apr. 29, 2005 (6 pp.).
Harlan, Robert D., Jan. 26, 2007 Office Action from U.S. Appl. No. 11/117,981, filed Apr. 29, 2005 (8 pp.).
Harlan, Robert D., Jul. 12, 2007 Office Action from U.S. Appl. No. 11/117,981, filed Apr. 29, 2005 (6 pp.).
Harlan, Robert D., Jan. 2, 2008 Office Action from U.S. Appl. No. 11/117,981, filed Apr. 29, 2005 (6 pp.).
Harlan, Robert D., Jul. 25, 2008 Office Action from U.S. Appl. No. 11/117,981, filed Apr. 29, 2005 (8 pp.).
Maksymonko, John M., Feb. 20, 2008 Office Action from U.S. Appl. No. 11/305,279, filed Dec. 16, 2005 (14 pp.).
Maksymonko, John M., Aug. 6, 2008 Office Action from U.S. Appl. No. 11/305,279, filed Dec. 16, 2005 (11 pp.).
Maksymonko, John M., Jul. 17, 2008 Office Action from U.S. Appl. No. 11/305,281, filed Dec. 16, 2005 (13 pp.).
Le, Hoa T., Sep. 25, 2008 Office Action from U.S. Appl. No. 11/612,554, filed Dec. 19, 2006 (8 pp.).
Maksymonko, John M., Jun. 11, 2008 Office Action from U.S. Appl. No. 11/642,124, filed Dec. 20, 2006 (16 pp.).
Maksymonko, John M., May 30, 2008 Office Action from U.S. Appl. No. 11/642,795, filed Dec. 20, 2006 (12 pp.).
Maksymonko, John M., May 28, 2008 Office Action from U.S. Appl. No. 11/642,802, filed Dec. 20, 2006 (10 pp.).
Chen, Jizhuang, Dec. 30, 2005 Office Action from Chinese Patent Application No. 02819527.2 filed Oct. 4, 2002 (9 pp.).
Chen, Jizhuang, Dec. 21, 2007 Office Action from Chinese Patent Application No. 02819527.2 filed Oct. 4, 2002 (12 pp.).
Chen, Jizhuang, Sep. 26, 2008 Office Action from Chinese Patent Application No. 02819527.2 filed Oct. 4, 2002 (4 pp.).
Schutte, M., Aug. 8, 2006 Office Action from European Patent Application No. 02807196.7 filed Oct. 4, 2002 (5 pp.).
Schutte, Maya, Sep. 3, 2007 Office Action from European Patent Application No. 02807196.7 filed Oct. 4, 2002 (2 pp.).
Watanabe, Y., May 7, 2008 Office Action from Japanese Patent Application No. 582224/2003 filed Oct. 4, 2002 (5 pp.).
Watanabe, Y., Jul. 29, 2008 Office Action from Japanese Patent Application No. 582224/2003 filed Oct. 4, 2002 (17 pp.).
May 30, 2008 International Search Report from PCT Patent Application No. PCT/US2007/026031 filed Dec. 19, 2007 (4 pp.).
May 27, 2008 International Search Report from PCT Patent Application No. PCT/US2007/087869 filed Dec. 18, 2007 (4 pp.).
Aug. 25, 2008 International Search Report from PCT Patent Application No. PCT/US2008/068838 filed Jun. 30, 2008 (4 pp.).
Lipman, Bernard, Mar. 26, 2002 Notice of Allowance from U.S. Appl. No. 09/970,830, filed Oct. 4, 2001 (4 pp.).
Kiliman, Leszek B., Feb. 13, 2003 Office from U.S. Appl. No. 10/038,748, filed Dec. 31, 2001 (3 pp.).
Kiliman, Leszak B., Aug. 25, 2003 Notice of Allowance from U.S. Appl. No. 10/038,748, filed Dec. 31, 2001 (5 pp.).
Harlan, Robert D., Mar. 17, 2004 Restriction/Election Office Action from U.S. Appl. No. 10/223,393, filed Aug. 19, 2002 (6 pp.).
Harlan, Robert D., Jun. 22, 2004 Office Action from U.S. Appl. No. 10/223,393, filed Aug. 19, 2002 (6 pp.).
Harlan, Robert D., Jan. 3, 2005 Notice of Allowance from U.S. Appl. No. 10/223,393, filed Aug. 19, 2002 (6 pp.).
Lipman, Bernard, Mar. 25, 2004 Restriction/Election Office Action from U.S. Appl. No. 10/331,841, filed Dec. 30, 2002 (6 pp.).
Lipman, Bernard, Nov. 18, 2004 Notice of Allowance from U.S. Appl. No. 10/331,841, filed Dec. 30, 2002 (5 pp.).
Lipman, Bernard, Mar. 24, 2004 Restriction/Election Office Action from U.S. Appl. No. 10/345,498, filed Jan. 16, 2003 (5 pp.).
Lipman, Bernard, Nov. 23, 2004 Notice of Allowance from U.S. Appl. No. 10/345,498, filed Jan. 16, 2003 (5 pp.).
Choi, Ling Siu, Mar. 24, 2006 Office Action from U.S. Appl. No. 10/755,648, filed Jan. 12, 2004 (11 pp.).
Choi, Ling Siu, Dec. 4, 2006 Notice of Allowance from U.S. Appl. No. 10/755,648, filed Jan. 12, 2004 (9 pp.).
Asinovsky, Olga, Aug. 16, 2007 Advisory Action from U.S. Appl. No. 10/791,049, filed Mar. 2, 2004 (2 pp.).
Asinovsky, Olga, Jul. 29, 2008 Advisory Action from U.S. Appl. No. 10/791,049, filed Mar. 2, 2004 (3 pp.).
Harlan, Robert D., Jan. 9, 2008 Advisory Action from U.S. Appl. No. 10/791,177, filed Mar. 2, 2004 (3 pp.).
Harlan, Robert D., Mar. 7, 2008 Advisory Action from U.S. Appl. No. 10/791,177, filed Mar. 2, 2004 (3 pp.).
Le, Hoa T., Dec. 14, 2004 Office Action from U.S. Appl. No. 10/791,491, filed Mar. 2, 2004 (5 pp.).
Le, Hoa T., Jul. 5, 2005 Office Action from U.S. Appl. No. 10/791,491, filed Mar. 2, 2004 (9 pp.).
Le, Hoa T., Apr. 10, 2006 Notice of Allowance from U.S. Appl. No. 10/791,491, filed Mar. 2, 2004 (5 pp.).
Kiliman, Leszak B., May 15, 2007 Advisory Action from U.S. Appl. No. 10/817,995, filed Apr. 5, 2004 (2 pp.).
Kiliman, Leszak B., Apr. 2, 2008 Notice of Allowance from U.S. Appl. No. 10/817,995, filed Apr. 5, 2004 (5 pp.).
Mullis, Jeffrey C., Nov. 5, 2008 Advisory Action from U.S. Appl. No. 11/050,115, filed Feb. 3, 2005 (4 pp.).
Lipman, Bernard, May 21, 2007 Notice of Allowance from U.S. Appl. No. 11/058,156, filed Feb. 15, 2005 (3 pp.).
Lipman, Bernard, Aug. 28, 2007 Notice of Allowance from U.S. Appl. No. 11/058,156, filed Feb. 15, 2005 (5 pp.).
Lipman, Bernard, Feb. 28, 2008 Notice of Allowance from U.S. Appl. No. 11/058,156, filed Feb. 15, 2005 (5 pp.).
Lipman, Bernard, May 29, 2008 Notice of Allowance from U.S. Appl. No. 11/058,156, filed Feb. 15, 2005 (5 pp.).
Lipman, Bernard, Oct. 3, 2006 Notice of Allowance from U.S. Appl. No. 11/064,234, filed Feb. 22, 2005 (5 pp.).
Haider, Saira Bano, Dec. 22, 2006 Advisory Action from U.S. Appl. No. 11/104,759, filed Apr. 13, 2005 (3 pp.).
Haider, Saira Bano, Mar. 19, 2008 Advisory Action from U.S. Appl. No. 11/104,759, filed Apr. 13, 2005 (3 pp.).
Haider, Saira Bano, Dec. 2, 2008 Office Action from U.S. Appl. No. 11/104,759, filed Apr. 13, 2005 (10 pp.).
Lipman, Bernard, Sep. 14, 2006 Office Action from U.S. Appl. No. 11/168,297, filed Jun. 29, 2005 (4 pp.).
Lipman, Bernard, Mar. 2, 2007 Notice of Allowance from U.S. Appl. No. 11/168,297, filed Jun. 29, 2005 (3 pp.).
Lipman, Bernard, Apr. 18, 2007 Supplemental Notice of Allowability from U.S. Appl. No. 11/168,297, filed Jun. 29, 2005 (3 pp.).
Lipman, Bernard, Mar. 20, 2008 Office Action from U.S. Appl. No. 11/764,607, filed Jun. 18, 2007 (4 pp.).
Lipman, Bernard, Sep. 25, 2008 Notice of Allowance from U.S. Appl. No. 11/764,607, filed Jun. 18, 2007 (3 pp.).
Russell, Graham, Nov. 4, 2008 Office Action from European Patent Application No. 05742316.2 filed Mar. 28, 2005 (2 pp.).
Schutte, M., Nov. 13, 2003 International Search Report from PCT Patent Application No. PCT/US02/31817 filed Oct. 4, 2002 (3 pp.).
Schutte, M., May 28, 2004 International Search Report from PCT Patent Application No. PCT/US03/40375 filed Dec. 18, 2003 (3 pp.).

Iraegui Retolaza, E., Jul. 9, 2004 International Search Report from PCT Patent Application No. PCT/US2004/001000 filed Jan. 15, 2004 (3 pp.).

Russell, G., Aug. 1, 2005 International Search Report from PCT Patent Application No. PCT/US2005/010352 filed Mar. 28, 2005 (3 pp.).

Mettler, Rolf-Martin, May 27, 2008 International Search Report from PCT Patent Application No. PCT/US2007/087869 filed Dec. 18, 2007 (2 pp.).

Iraegui Retolaza, E., May 30, 2008 International Search Report from PCT Patent Application No. PCT/US2007/026031 filed Dec. 19, 2007 (3 pp.).

Haider, Saira Bano, Sep. 11, 2009 Examiner's Answer from U.S. Appl. No. 11/104,759 (9 pp.).

Harlan, Robert D., Sep. 29, 2009 Final Office Action from U.S. Appl. No. 11/117,981 (6 pp.).

Peets, Monique R., May 11, 2009 Restriction/Election Office Action from U.S. Appl. No. 11/697,801 (6 pp.).

Mullis, Jeffrey C., May 19, 2009 Advisory Action from U.S. Appl. No. 10/791,049 (5 pp.).

Zemel, Irina Sopja, Office Action dated May 28, 2009 from U.S. Appl. No. 11/305,279 (7 pp.).

Peets, Monique R., Jul. 20, 2009 Office Action from U.S. Appl. No. 11/697,801 (9 pp.).

Chevalier, Alicia Ann, Nov. 25, 2009 Office Action from U.S. Appl. No. 10/886,283 [7 pp.].

Zemel, Irina Sopja, Dec. 3, 2009 Final Office Action from U.S. Appl. No. 11/305,279 [10 pp.].

Harlan, Robert D., Dec. 4, 2009 Notice of Allowance from U.S. Appl. No. 11/117,981 [5 pp.].

Mullis, Jeffrey C., Dec. 18, 2009 Supplemental Notice of Allowability from U.S. Appl. No. 11/050,115 [2 pp.].

Harlan, Robert D., Dec. 29, 2009 Notice of Allowance from U.S. Appl. No. 10/791,177 [6 pp.].

Peets, Monique R., Jan. 5, 2010 Final Office Action from U.S. Appl. No. 11/697,801 [9 pp.].

Pak, Hannah J., Jan. 6, 2010 Final Office Action from U.S. Appl. No. 11/941,128 [10 pp.].

Harlan, Robert D., Dec. 28, 2009 Office Action from U.S. Appl. No. 12/504,255 [6 pp.].

Wheeler, Thurman Michael, Feb. 8, 2010 Office Action from U.S. Appl. No. 11/642,796 [13 pp.].

Sykes, Altrev C., Apr. 5, 2010 Final Office Action from U.S. Appl. No. 11/818,023 (24 pp.).

Peets, Monique R., Apr. 15, 2010 Notice of Allowance from U.S. Appl. No. 11/697,801 (5 pp.).

Pak, Hannah J., Apr. 30, 2010 Notice of Allowance from U.S. Appl. No. 11/941,128 (11 pp.).

Sykes, Altrev C., Oct. 16, 2009 Office Action from U.S. Appl. No. 11/818,023 [20 pp.].

Mulcahy, Peter D., Nov. 9, 2009 Final Office Action from U.S. Appl. No. 11/642,802 [6 pp.].

Kiliman, Leszek B., Nov. 13, 2009 Office Action from U.S. Appl. No. 10/817,995 [6 pp.].

Ducheneaux, Frank D., Jun. 8, 2010 Office Action from U.S. Appl. No. 10/817,995 [19 pp.].

Harlan, Robert D., Jun. 9, 2010 Office Action from U.S. Appl. No. 12/504,255 [6 pp.].

Chevalier, Alicia Ann, Jul. 8, 2010 Advisory Action from U.S. Appl. No. 10/886,283 [3 pp.].

Wheeler, Thurman Michael, Jul. 30, 2010 Final Office Action from U.S. Appl. No. 11/642,796 [15 pp.].

\* cited by examiner

Looped conformation

Extended conformation

NON-SPHERICAL NANOPARTICLES MADE FROM LIVING TRIBLOCK POLYMER CHAINS

This application claims the benefit of U.S. Provisional Application No. 60/751,602, filed Dec. 19, 2005, which is incorporated herein by reference.

BACKGROUND OF THE INVENTION

The present invention is generally related to polymeric nanoparticles. More particularly, the present invention provides polymeric nanoparticles comprising triblock copolymer chains and optionally diblock copolymer chains. The architecture of the polymeric nanoparticles may be controlled via, for example, by adjusting the size of one or more of the blocks in the triblock copolymer chain and/or by adjusting the ratio of diblock to triblock copolymer chains. The present invention also provides a method for preparing the polymeric nanoparticles and a rubber article with improved physical properties.

Over the past several years, polymeric nanoparticles have attracted increased attention not only in the technical fields such as catalysis, combinatorial chemistry, protein supports, magnets, and photonics, but also in the manufacture of rubbery products such as tires. For example, nanoparticles can modify rubbers by uniformly dispersing throughout a host rubber composition as discrete particles. The physical properties of rubber such as moldability and tenacity can often be improved through such modifications. Moreover, some polymeric nanoparticles may serve as a reinforcement material for rubber. For example, polymer nanostrings are capable of dispersing evenly throughout a rubber composition, while maintaining a degree of entanglement between the individual nano-strings, leading to improved reinforcement over traditional reinforcing fillers.

However, an indiscriminate addition of nanoparticles to rubber may cause degradation of the matrix rubber material. Rather, very careful control and selection of nanoparticles having suitable architecture, size, shape, material composition, and surface chemistry, etc., are needed to improve the rubber matrix characteristics. For example, properties of polymeric nanoparticles made from diblock copolymer chains are controlled by the thermodynamics of diblock copolymers in a selected solvent. The thermodynamic phase diagram of those systems usually depends on two factors, the volume fractions of the components ($\phi_i$, i=1, 2, 3 ...) and the miscibility between them ($\chi_{ij}N_i$ parameter between components). Therefore, for a given system, i.e., when the $\chi_{ij}N_i$ parameters between components are fixed, the formation of micelle structures depends primarily on the volume fraction of each component ($\phi_i$, i=1, 2, 3 ...). In order to obtain a micelle nanoparticle of desired structure, the concentration or the volume fraction must be controlled. Flexibility of concentration adjustment is usually small due to the underlying thermodynamic laws and the phase diagrams. As such, it cannot provide high flexibility in concentration variations. This could raise unwelcome constraints in industrial processes.

Advantageously, the present invention provides non-spherical polymer nanoparticles comprising triblock copolymer chains, and optionally diblock copolymer chains in a variety of architectures, as well as a flexible process for their manufacture.

BRIEF DESCRIPTION OF THE INVENTION

In one embodiment of the invention, there is provided a polymeric nanoparticle comprising a core and one or more shell layers, wherein the core comprises a cross-linked multi-vinyl substituted aromatic hydrocarbon, and the shell layers comprise at least one of a conjugated diene layer or a vinyl aromatic hydrocarbon layer, and wherein the nanoparticle is non-spherical in shape.

In another embodiment, there is provided a polymeric nanoparticle made from triblock copolymers comprising Block α, Block β, and Block γ as represented by the following formula (I):

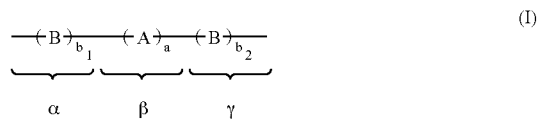

in which A comprises a conjugated diene monomer; B comprises a vinyl aromatic monomer; a is an integer of from about 10 to about 1000K; $b_1 \approx b_2$ and each of them is an integer of from about 10 to about 1000K, wherein the nanoparticles have a non-spherical shape.

In a further embodiment, there is provided a method of preparing polymer nanoparticles from triblock copolymer chains comprising Block α, Block β, and Block γ as represented by the following formula (I):

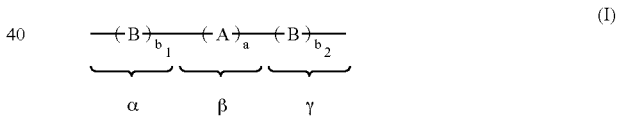

in which A comprises a conjugated diene monomer; B comprises a vinyl aromatic monomer; a is an integer of from about 10 to about 1000K; $b_1 \approx b_2$ and each of them is an integer of from about 10 to about 1000K, in a liquid hydrocarbon medium, comprising the steps of a) polymerizing conjugated diene monomers A into Block β with a divalent anionic initiator and optionally adding a monovalent anionic initiator; b) copolymerizing vinyl aromatic monomers B with Block β to produce Block α and Block γ, and obtaining a triblock copolymer comprising Block α, Block β, and Block γ; c) assembling the triblock copolymers in the liquid hydrocarbon medium to form micelle structures; and d) copolymerizing multiple-vinyl-substituted aromatic hydrocarbons with Block α and Block γ of the triblock copolymers in the micelle structures to form polymer nanoparticles.

In another embodiment, there is provided rubber compositions comprising the above described polymeric nanoparticles.

In a further embodiment, there is provided a rubber article, including a tire, comprising vulcanized rubber compositions comprising the above described polymeric nanoparticles.

BRIEF DESCRIPTION OF THE DRAWINGS

The drawings are only for purposes of illustrating preferred embodiments and are not to be construed as limiting the invention. In the drawings appended hereto.

DETAILED DESCRIPTION OF ILLUSTRATIVE EMBODIMENTS

Figure 1:
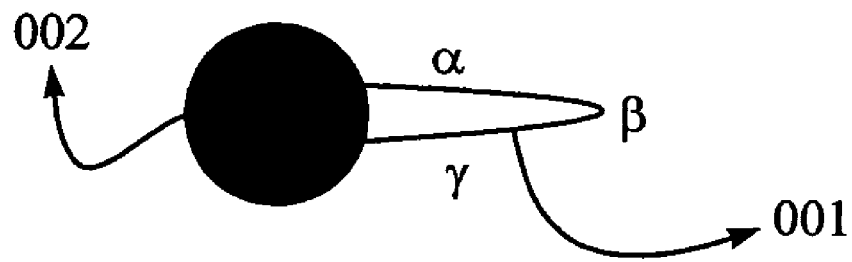
FIG. 1 illustrates two possible conformations of a triblock copolymer chain in polymer nanoparticles in an embodiment of the invention.
Figure 1:
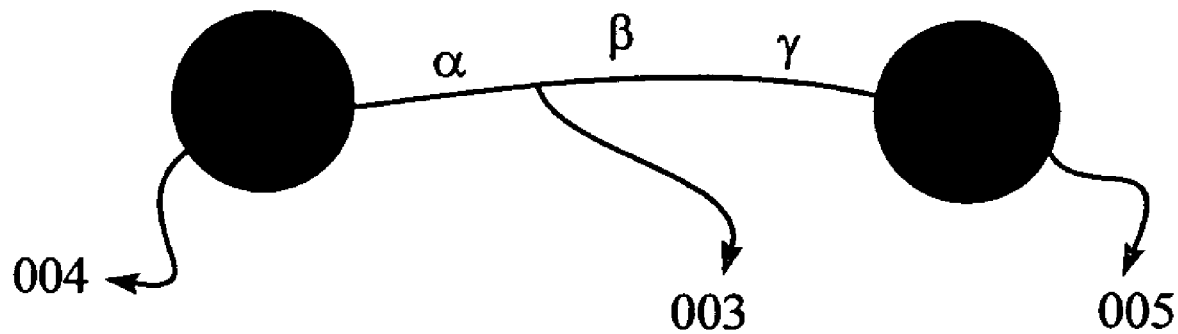

It is to be understood herein, that if a "range" or "group" is mentioned with respect to a particular characteristic of the present invention, for example, molecular weight, ratio, percentage, chemical group, and temperature etc., it relates to and explicitly incorporates herein each and every specific member and combination of sub-ranges or sub-groups therein whatsoever. Thus, any specified range or group is to be understood as a shorthand way of referring to each and every member of a range or group individually as well as each and every possible sub-range or sub-group encompassed therein; and similarly with respect to any sub-ranges or sub-groups therein.

The present invention provides for non-spherical polymeric nanoparticles formed from triblock copolymer chains of the following formula (I):

wherein A comprises a conjugated diene monomer; B comprises a vinyl aromatic monomer; a is an integer of from about 1 to about 100,000 and $b_1 \approx b_2$ and each of them is an integer of from about 1 to about 100,000, preferably from about 1 to about 10,000.

By $b_1 \approx b_2$, it is intended that the value $\Delta$ calculated from the following equation ranges from about 0 to about 20%, preferably from about 0 to about 10%, and more preferably from about 0 to about 5%.

$$\Delta = \frac{|b_1 - b_2|}{b_1 + b_2} \times 100\%$$

For simplicity, the terms of "Block α", "Block β", and "Block γ" are hereinafter used to denote the three blocks of the triblock copolymer respectively as shown below:

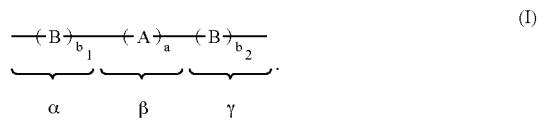

The triblock copolymers and the polymer nanoparticles are formed through dispersion polymerization, although emulsion polymerization may also be contemplated. The method of the invention can comprise a multi-stage anionic polymerization. Multi-stage anionic polymerizations have been conducted to prepare block-copolymers, for example in U.S. Pat. No. 4,386,125, which is incorporated herein by reference. Other relevant references include U.S. Pat. Nos. 6,437,050 and 6,875,818, and U.S. Patent Application 2005/0154117, all of which are incorporated herein by reference.

The polymer nanoparticles of the invention are formed from triblock copolymer chains comprising Block α, Block β, and Block γ. Living blocks such as blocks α and blocks γ may be crosslinked with a multiple-vinyl-substituted aromatic hydrocarbon to form the desired polymer nanoparticles. The polymer nanoparticles preferably retain their discrete nature with little or no polymerization between each other.

According to one embodiment of the invention, a triblock copolymer is formed of vinyl aromatic hydrocarbon monomers and conjugated diene monomers in a hydrocarbon medium. The liquid hydrocarbon medium functions as the dispersion solvent, and may be selected from any suitable aliphatic hydrocarbons, alicyclic hydrocarbons, or mixture thereof, with a proviso that it exists in liquid state during the nanoparticles' formation procedure. Exemplary aliphatic hydrocarbons include, but are not limited to, pentane, isopentane, 2,2 dimethyl-butane, hexane, heptane, octane, nonane, decane, and the like. Exemplary alicyclic hydrocarbons include, but are not limited to, cyclopentane, methyl cyclopentane, cyclohexane, methyl cyclopentane, cycloheptane, cyclooctane, cyclononane, cyclodecane, and the like. These hydrocarbons may be used individually or in combination. Generally, aromatic hydrocarbons and polar solvents are not preferred as the liquid medium. In one embodiment, the liquid hydrocarbon medium is hexane.

In one embodiment, the polymerization of monomers into the triblock polymer is initiated via addition of divalent anionic initiators that are known in the art as useful in the copolymerization of diene monomers and vinyl aromatic hydrocarbons. Such initiators can be selected from organic compounds comprising 2 lithium groups as represented by the formula as shown below:

wherein R is a hydrocarbon group having 2 valences. R generally contains 4 to 30 carbon atoms per R group.

In a variety of exemplary embodiments, a bi-functional anionic initiator may have a general formula (L) as shown below:

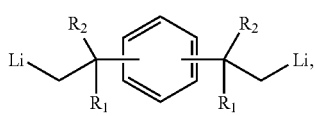

(L)

in which $R_1$ is hydrogen or methyl; and $R_2$ includes aliphatic radicals and cycloaliphatic radicals, such as alkyl, cycloalkyl, cycloalkylalkyl, alkylcycloalkyl, alkenyl, as well as aryl and alkylaryl radicals. Specific examples of $R_2$ groups include, but are not limited to, alkyls such as methyl, ethyl, n-propyl, isopropyl, n-butyl, isobutyl, t-butyl, sec-butyl, n-amyl, isoamyl, n-hexyl, n-octyl, n-decyl, and the like; cycloalkyls and alkylcycloalkyl such as cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, 4-butylcyclohexyl, and the like; cycloalkylalkyls such as cyclopentyl-methyl, cyclohexyl-ethyl, cyclopentyl-ethyl, methyl-cyclopentylethyl, 4-cyclohexylbutyl, and the like; alkenyls such as vinyl, propenyl, and the like; arylalkyls such as 4-phenylbutyl; aryls and alkylaryls such as phenyl, naphthyl, 4-butylphenyl, p-tolyl, and the like.

$R_1$ and $R_2$ in formula (L) can be methyl and sec-butyl respectively; and the bi-functional anionic initiator has the formula (L-1) as shown below:

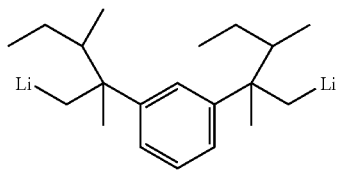

(L-1)

The formula (L-1) bi-functional anionic initiator may be prepared, for example, according to the following reaction:

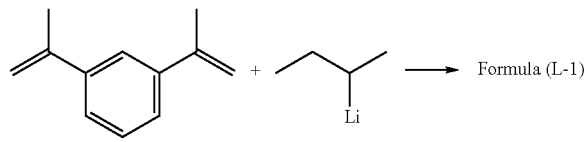

Formula (L-1)

Other bi-functional anionic initiators include, but are not limited to, 1,4-dilithiobutane, 1,5-dilithiopetane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, and the like, and mixtures thereof.

The bi-functional anionic initiator may be used singly, or may be combined with each other to initiate the polymerization of conjugated diene monomers A into Block β. It should be understood that typically the bi-functional anionic initiator residue is present in approximately the central region of Block β. For example, an exemplary living block β may be represented as shown below:

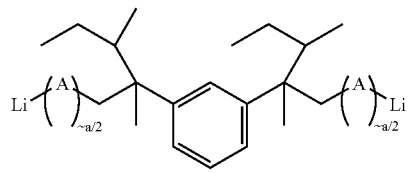

(An exemplary living block β)

Any suitable conjugated diene or mixture thereof may be used as the monomer(s) A and be polymerized into Block β via the bi-functional anionic initiator. For example, the conjugated diene may be selected from conjugated 1,3-diene monomer represented by the formula (II) as shown below:

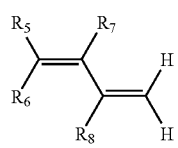

Formula (II)

in which $R_5$, $R_6$, $R_7$, and $R_8$ are each independently selected from the group consisting of hydrogen, methyl, ethyl, propyl, and isopropyl. $C_4$-$C_8$ conjugated diene monomers of formula (II) are the most preferred.

Specific examples of the conjugated diene monomers A include, but are not limited to, 1,3-butadiene, isoprene (2-methyl-1,3-butadiene), cis- and trans-piperylene (1,3-pentadiene), 2,3-dimethyl-1,3-butadiene, 1,3-pentadiene, cis- and trans-1,3-hexadiene, cis- and trans-2-methyl-1,3-pentadiene, cis- and trans-3-methyl-1,3-pentadiene, 4-methyl-1,3-pentadiene, 2,4-dimethyl-1,3-pentadiene, and the like, and the mixture thereof. In certain embodiments, 1,3-butadiene, isoprene, or combination thereof are used as the conjugated diene monomer A.

The polymerization of conjugated diene monomers A into Block β may last as long as necessary until the reaction is completed and a desired degree of polymerization, i.e. "a" in Formula (I), is obtained. The polymerization reaction of this step may last from about 0.1 hours to about 10 hours, in another embodiment from about 0.2 hours to about 8 hours, and in another embodiment from about 0.2 hours to about 4 hours. In certain embodiments, the polymerization reactions of this step last about 1.5 hours.

The anionic polymerization of the invention may be conducted in the presence of a modifier or a 1,2-microstructure controlling agent, so as to, for example, increase the reaction rate, equalize the reactivity ratio of monomers, and/or control the 1,2-microstructure in the conjugated diene monomers A. Suitable modifiers include, but are not limited to, triethylamine, tri-n-butylamine, hexamethylphosphoric acid triamide, N,N, N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo [2.2.2]octane, diethyl ether, tri-n-butylphosphine, p-dioxane, 1,2 dimethoxy ethane, dimethyl ether, methyl ethyl ether, ethyl propyl ether, di-n-propyl ether, di-n-octyl ether, anisole, dibenzyl ether, diphenyl ether, dimethylethylamine, bix-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxolanyl propanes (OOPs), 2,2-bis-(4-methyl dioxane), bistetrahydrofuryl propane, and the like.

In certain embodiments, the anionic polymerization of the invention can be conducted in the presence of an amine compound such as triethyl amine, trimethyl amine, tripropyl amine, tri-isopropyl amine, tri-n-butyl amine, and the like, and the mixtures thereof.

Other modifiers or 1,2-microstructure controlling agents used in the present invention may be linear oxolanyl oligomers represented by the structural formula (IV) and cyclic oligomers represented by the structural formula (V), as shown below:

Formula (IV)

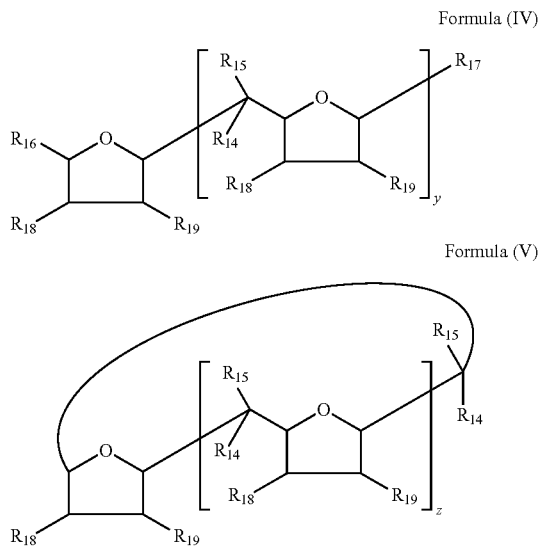

Formula (V)

wherein $R_{14}$ and $R_{15}$ are independently hydrogen or a $C_1$-$C_8$ alkyl group; $R_{16}$, $R_{17}$, $R_{18}$, and $R_{19}$ are independently hydrogen or a $C_1$-$C_6$ alkyl group; y is an integer of 1 to 5 inclusive, and z is an integer of 3 to 5 inclusive.

Specific examples of modifiers or 1,2-microstructure controlling agents include, but are not limited to, oligomeric oxolanyl propanes (OOPs); 2,2-bis-(4-methyl dioxane); bis(2-oxolanyl)methane; 1,1-bis(2-oxolanyl)ethane; bistetrahydrofuryl propane; 2,2-bis(2-oxolanyl)propane; 2,2-bis(5-methyl-2-oxolanyl)propane; 2,2-bis-(3,4,5-trimethyl-2-oxolanyl)propane; 2,5-bis(2-oxolanyl-2-propyl)oxolane; octamethylperhydrocyclotetrafurfurylene (cyclic tetramer); 2,2-bis(2-oxolanyl)butane; and the like. A mixture of two or more modifiers or 1,2-microstructure controlling agents may also be used.

The vinyl aromatic monomers B include, but are not limited to styrene, α-methyl-styrene, 1-vinyl naphthalene, 2-vinyl naphthalene, vinyl toluene, methoxystyrene, t-butoxystyrene, and the like; as well as alkyl, cycloalkyl, aryl, alkaryl, and aralkyl derivatives thereof, in which the total number of carbon atoms in the monomer is generally not greater than about 18; and mixtures thereof. In exemplified embodiments, the vinyl aromatic monomer B comprises styrene.

Copolymerizing vinyl aromatic monomers B with the living block β starts at both living ends of Block β. Block α and Block γ may thus be formed in two directions, obtaining a triblock copolymer comprising Block α, Block β, and Block γ, as shown in Formula (I).

Without being bound to any theory, it is believed that Block β is more soluble or miscible in a selected liquid hydrocarbon medium than Blocks α and γ, facilitating the subsequent micelle-like assembling and nanoparticle formation from the triblock copolymer chains comprising Block α, Block β, and Block γ.

Depending on their miscibility, polymer chains in solution or suspension system can be self-assembled into domains of various structures. Without being bound to any theory, it is believed that a micelle-like structure may be formed by aggregating the triblock copolymer chains comprising Block α, Block β, and Block γ. Blocks α and γ are typically directed toward the central region of the micelle and Blocks β are typically extended away from the center.

Without being bound to any theory, it is believed that a triblock copolymer chain comprising Block α, Block β, and Block γ may exist in two conformations. With reference to FIG. 1, the first possible conformation may be called a "looped" conformation, in which the triblock copolymer chain 001 is looped and Block α and Block γ are directed toward the central region 002 of a micelle and Block β is extended away from the central region 002. The second possible conformation may be called "extended" conformation, in which the triblock copolymer chain 003 is extended and Block α and Block γ are directed toward two central regions (004 and 005) of two micelles; and Block β may function as a bridge between the two central regions.

Without being bound to any theory, it is believed that a triblock copolymer chain comprising Block α, Block β, and Block γ may be used to adjust the interactions between micelle-like structural domains. As such, the present invention can not only selectively manipulate the interactions between formed micelles, but also take advantage of the self-assembly thermodynamics of copolymer chains in a selected solvent. For example, a triblock copolymer chain of the invention may behave like a bridge between micelles, if Block β is sufficiently long. Thus, the formation of randomly linked tree-like micelles can be used for making nano-dendrites by adding a multiple-vinyl-substituted aromatic hydrocarbon such as divinyl benzene (DVB) to "freeze" the structure. Changing the size of the bridge can alter the physical forces between micelles. As a result, the change in physical forces can reconstruct the micelle structures, e.g., from two micelles to a cylinder, and then from several cylinders to a nano-sized chain or rope. If the bridge size is sufficiently small, the nano-assembly of polymer chains can change to spherical particles of flower-like inner structures.

In certain embodiments, diblock copolymers may optionally be combined and/or polymerized with the triblock copolymer chains comprising Block α, Block β, and Block γ, to effectively create assembling chains and build varieties of particle shapes. Such diblock copolymers may be comprised of a conjugated diene block and a vinyl aromatic hydrocarbon block. Suitable conjugated diene monomers and vinyl aromatic hydrocarbon monomers useful in the polymerization of the diblock copolymers are those identified above. The diblock copolymers may be copolymerized with the triblock copolymers by the addition of an monovalent anionic initiator to the polymerization reactor. In one embodiment, the anionic initiator is an alkyl lithium initiator such as n-butyl lithium, arenyllithium initiators, arenylsodium initiators, N-lithium dihydro carbon amides, aminoalkyllithiums, and alkyl tin lithiums. In certain embodiments, the diblock copolymers of the present invention include styrene-isoprene, styrene-butadiene or styrene-SBR diblock copolymers. Non-spherical polymeric nanoparticles may be constructed not only based on the self-assembly thermodynamics of triblock and optionally diblock copolymers in selected solvents, but also based on the selective manipulation of interactions between formed micelles.

Any suitable multiple-vinyl-substituted aromatic hydrocarbon or mixture thereof may be used to copolymerize with Blocks α and Blocks γ of the triblock copolymers, and optionally the vinyl aromatic hydrocarbon block of the diblock copolymer, in the micelle structures, and crosslink them to form polymer nanoparticles. Preferably, the multiple-vinyl-substituted aromatic hydrocarbon has a higher affinity with the vinyl aromatic hydrocarbon blocks of the triblock and diblock copolymers. As such, the multiple-vinyl-substituted aromatic hydrocarbon is able to migrate to the center of the micelle-like structures, and crosslink the center core of the micelle to form the polymer nanoparticles. Consequently, the non-spherical polymeric nanoparticles are formed from the micelle-like structures with a core made from multiple-vinyl-substituted aromatic hydrocarbons, a shell made from the conjugated diene blocks, and a layer made from the vinyl aromatic hydrocarbon blocks, which lies between the core and the shell.

In certain embodiments, the triblock copolymer chain(s) of the present invention are in "extended" conformation, as illustrated in FIG. 1, and may function to connect two or more micelle-like structures. Therefore, Block β is called "bridge" in certain embodiments of the invention. Bridge size may be characterized by, for example, the value a in formula (I), molecular weight (Mw or Mn) of Block β, or length of Block β, among others.

The multiple-vinyl-substituted aromatic hydrocarbons can be represented by the formula below:

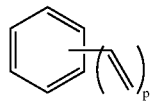

in which p is an integer and $2 \leq p \leq 6$, preferably, p is 2 or 3, more preferably p is 2, i.e. di-vinyl-benzene (DVB).

In certain embodiments, the divinyl benzene may be selected from any one of the following isomers or any combination thereof:

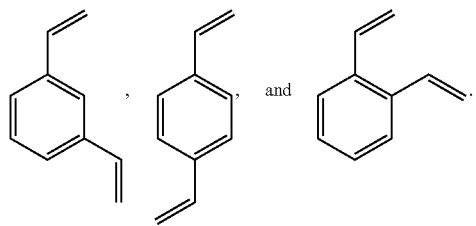

In copolymerizing multiple-vinyl-substituted aromatic hydrocarbons with the vinyl aromatic hydrocarbon blocks of the triblock and optionally diblock copolymers in the micelle structures to form polymer nanoparticles, the copolymerization time for this step may last typically from about 0.1 hours to about 24 hours, preferably from about 0.1 hours to about 10 hours, more preferably from about 0.4 hours to about 8 hours.

The process of preparing the polymer nanoparticles may be conducted at a temperature of from about −70° F. to about 350° F., preferably form about 25° F. to about 300° F., and more preferably form about 100° F. to about 200° F. In exemplified embodiments, a reactor was equipped with external jacket, which was heated to a temperature around 130° F.

The polymerization reactions used to prepare the polymer nanoparticles may be terminated with a terminating agent.

Suitable terminating agents include, but are not limited to, alcohols such as methanol, ethanol, propanol, and isopropanol; amines, $MeSiCl_3$, $Me_2SiCl_2$, $Me_3SiCl$, $SnCl_4$, $MeSnCl_3$, $Me_2SnCl_2$, $Me_3SnCl$, and etc. In certain embodiments, the terminating agent may optionally contain an antioxidant such as butylated hydroxytoluene (BHT).

In the following four sections, specific conditions for the preparation of non-spherical polymeric nanoparticles with controlled architectures of tree-like dendrite, nano-rope, nano-sphere with flower-like inner structure and nano-branch will be described in detail.

Tree-Like Dendrite

In certain embodiments, the controlled architecture of the polymer nanoparticle is in the shape of tree-like dendrite. The term "tree-like" dendrite is meant to encompass structures comprising both longer and shorter "branches", similar to the structure of a tree. The mean diameter of the tree-like dendrite nanoparticle may be broadly within the range of from about 5 nm to about 100 microns, in another embodiment within the range of from about 10 nm to about 50 microns, and in a further embodiment within the range of from about 100 nm to about 5 microns In preparing the tree-like dendrite nanoparticles, the number average molecular weight ($Mn_\beta$) of Block β may be controlled within the range of from about 19.5K to about 35K, and in another embodiment within the range of from about 22K to about 30K, and in another embodiment within the range of from about 24K to about 27K. In certain embodiments, $Mn_\beta \approx 25K$.

In preparing the tree-like dendrites, the number average molecular weight ($Mn_\alpha$) of Block α is approximately equal to the number average molecular weight ($Mn_\gamma$) of Block γ, i.e. $Mn_\alpha \approx Mn_\gamma$. In certain embodiments, $Mn_\alpha$ or $Mn_\gamma$ may be controlled within the range of from about 20K to about 50K, in another embodiment within the range of from about 25K to about 45K, and in a further embodiment within the range of from about 30K to about 40K. In certain embodiments, $Mn_\alpha \approx Mn_\gamma \approx 35K$.

(II) Nano-Rope

In some embodiments, the controlled architecture of the polymer nanoparticle is in the shape of nano-rope. The mean diameter of the nano-rope nanoparticle may be broadly within the range of from about 1 nm to about 200 nm, in another embodiment within the range of from about 5 nm to about 100 nm, in a further embodiment within the range of from about 5 nm to about 80 nm, and in yet another embodiment within the range of from about 5 nm to about 50 nm. The length of the nano-rope may be broadly within the range of from about 0.1 μm to about 200 μm, in another embodiment within the range of from about 0.5 μm to about 50 μm, and in another embodiment within the range of from about 1 μm to about 10 μm.

In preparing the nano-ropes, the number average molecular weight ($Mn_\beta$) of Block β may be controlled within the range of from about 11.5K to about 19.5K, in another embodiment within the range of from about 13K to about 16K, and in a further embodiment within the range of from about 13.5K to about 15K. In certain embodiments, $Mn_\beta \approx 14K$. In preparing the nano-ropes, the number average molecular weight ($Mn_\alpha$) of Block α is approximately equal to the number average molecular weight ($Mn_\gamma$) of Block γ, i.e. $Mn_\alpha \approx Mn_\gamma$. In a variety of exemplary embodiments, $Mn_\alpha$ or $Mn_\gamma$ may be controlled within the range of from about 20K to about 50K, alternatively within the range of from about 25K to about 45K, and in another embodiment within the range of from about 30K to about 40K. In certain embodiments, $Mn_\alpha \approx Mn_\gamma \approx 35K$.

(III) Nano-Spheres with Flower-Like Inner Structure

In some embodiments, the controlled architecture of the polymer nanoparticle is in the shape of nano-spheres with flower-like inner structure. The mean diameter of the spheres may be broadly within the range of from about 1 nm to about 500 nm, in another embodiment within the range of from about 1 nm to about 200 nm, in another embodiment within the range of from about 1 nm to about 100 nm, and in yet another embodiment within the range of from about 5 nm to about 80 nm.

In preparing the nano-spheres with flower-like inner structure the number average molecular weight ($Mn_\beta$) of Block β may be controlled within the range of from about 5K to about 11.5K, in another embodiment within the range of from about 7K to about 10K, and in another embodiment within the range of from about 8K to about 10K. In certain embodiments, $Mn_\beta \approx 9K$.

In preparing the nano-spheres with flower-like inner structure, the number average molecular weight ($Mn_\alpha$) of Block α is approximately equal to the number average molecular weight ($Mn_\gamma$) of Block γ, i.e. $Mn_\alpha \approx Mn_\gamma$. In certain embodiments, $Mn_\alpha$ or $Mn_\gamma$ may be controlled within the range of from about 20K to about 50K, in another embodiment within the range of from about 25K to about 45K, and in another embodiment within the range of from about 30K to about 40K. In certain embodiments, $Mn_\alpha \approx Mn_\gamma \approx 35K$.

(IV) Nano-Branch

In some embodiments, the controlled architecture of the polymer nanoparticle is in the shape of nano-branch. The mean diameter of the nano-branch may be broadly within the range of from about 1 nm to about 200 nm, in another embodiment within the range of from about 5 nm to about 100 μm, in a further embodiment within the range of from about 5 nm to about 80 μm, and in yet another embodiment within the range of from about 5 nm to about 50 μm.

In preparing the nano-branches, the number average molecular weight ($Mn_\beta$) of Block β may be controlled within the range of from about 3K to about 100K, in another embodiment within the range of from about 3K to about 50K, and in a further embodiment within the range of from about 3K to about 25K.

In preparing the nano-branches, the number average molecular weight ($Mn_\alpha$) of Block α is approximately equal to the number average molecular weight ($Mn_\gamma$) of Block γ, i.e. $Mn_\alpha \approx Mn_\gamma$. In a variety of exemplary embodiments, $Mn_\alpha$ or $Mn_\gamma$ may be controlled within the range of from about 10K to about 100K, in another embodiment within the range of from about 20K to about 50K and in another embodiment within the range of from about 20K to about 30K.

When copolymerizing multiple-vinyl-substituted aromatic hydrocarbons with the vinyl aromatic hydrocarbon blocks of the triblock and optionally diblock copolymers in the micelle structures to form polymer nano-branches, the weight concentration of the copolymers in the liquid hydrocarbon medium ($M_1$) may be broadly within the range of from about 5 to 40000, preferably within the range of from 5 to 30000, more preferably within the range of from 5 to 20000.

When diblock copolymers are prepared with the triblock copolymers, the ratio of divalent anionic initiator to the monovalent initiator can be range from 100:0 to 1:100, in another embodiment from 100:0 to 1:10, and in a further embodiment from 100:0 to 1:3.

The non-spherical polymer nanoparticles of the invention may be widely utilized in the technical fields of rubbers, plastics, tire manufacture, medicine, catalysis, combinatorial chemistry, protein supports, magnets, photonics, electronics, cosmetics, and all other applications envisioned by the skilled artisan. For example, they can be used as processing aids and reinforcing fillers in rubber compounds.

In a variety of exemplary embodiments, rubber articles such as tires may be manufactured from a rubber composition comprising the polymeric nanoparticles as described supra. References for this purpose may be made to, for example, U.S. Pat. No. 6,875,818.

In one embodiment, the present invention provides a rubber composition comprising (a) a rubber matrix; and (b) the non-spherical polymeric nanoparticles as described above. The typical amount of the polymeric nanoparticles in the rubber composition may broadly range from about 1 phr to about 150 phr, in another embodiment from about 1 phr to about 50 phr, in another embodiment from about 1 phr to about 20 phr, based on 100 parts rubber.

The terms "rubber" and "elastomer" if used herein, may be used interchangeably, unless otherwise prescribed. The terms such as "rubber composition", "compounded rubber" and "rubber compound", if used herein, are used interchangeably to refer to "rubber which has been blended or mixed with various ingredients and materials" and "rubber compounding" or "compounding" may be used to refer to the "mixing of such materials". Such terms are well known to those having skill in the rubber mixing or rubber compounding art.

The rubber matrix may comprise any solution polymerizable or emulsion polymerizable elastomer, for example, diene homopolymers, and copolymers and terpolymers of conjugated diene monomers with vinyl aromatic monomers and trienes such as myrcene. Exemplary diene homopolymers are those prepared from diolefin monomers having from 4 to about 12 carbon atoms. Exemplary vinyl aromatic polymers are those prepared from monomers having from 8 to about 20 carbon atoms. Examples of such monomers may be referred to the monomers for the nanoparticle formation as described supra. In one embodiment, the conjugated diene monomer and vinyl aromatic monomer are used at the weight ratios of from about 1:99 to about 99:1, in another embodiment the weight rations are from about 2:98 to about 98:2. The copolymers are preferably random copolymers which result from simultaneous copolymerization of the monomers with randomizing agents, as is known in the art.

The rubber matrix may comprise any conventionally employed treadstock rubber such as natural rubber, synthetic rubber and blends thereof. Such rubbers are well known to those skilled in the art and include synthetic polyisoprene rubber, styrene-butadiene rubber (SBR), styrene-isoprene-butadiene rubber, styrene-isoprene rubber, butadiene-isoprene rubber, polybutadiene, butyl rubber, neoprene, ethylene-propylene rubber, ethylene-propylene-diene rubber (EPDM), acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene-propylene rubber, and the like, and the mixture thereof.

Rubber matrix used in tires, hoses, power transmission belts and other industrial products has good compatibility with fillers, such as carbon black and silica. To attain improved interaction with fillers, the rubber matrix can be functionalized with various compounds, such as amines.

In one embodiment, carbon black can be used as a reinforcing filler in the rubber compounds of the present invention. The carbon black may be selected from any of the commonly available carbon blacks, but those having a surface area (EMSA) of at least 20 m$^2$/g and, more preferably, at least 35 m$^2$/g up to 200 m$^2$/g or higher are preferred. Surface area values may be determined by ASTM D-1765 using the cetyl-trimethyl-ammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. A mixture of two or more of the above blacks may also be used. Exemplary carbon blacks include N-110, N-220, N-339, N-330, N-343, N-351, N-550, N-660, and the like, as designated by ASTM D-1765-82a. The carbon blacks utilized may be in pelletized form or an unpelletized flocculent mass. Preferably, for more uniform mixing, unpelletized carbon black is used.

In certain embodiments, the amount of carbon black may broadly range from about 10 phr to about 150 phr, from about 20 phr to about 120 phr, and from about 30 phr to about 100 phr.

Silica may also be used as a filler in the rubber compounds of the present invention. Exemplary silica fillers include, but are not limited to, precipitated amorphous silica, wet silica (hydrated silicic acid), dry silica (anhydrous silicic acid), fumed silica, and the like. Among these, precipitated amorphous wet-process, hydrated silicas are preferred. In one embodiment, the surface area of the silica filler is from about 32 m$^2$/g to about 400 m$^2$/g, in another embodiment the surface area is from about 100 m$^2$/g to about 250 m$^2$/g, and in another embodiment the surface area is from about 150 m$^2$/g to about 220 m$^2$/g. The pH of the silica filler is generally within the range of about 5.5 to about 7, and in another embodiment within the range of about 5.5 to about 6.8.

The silica filler may be selected from any of the commonly available silicas. Some of the commercially available silicas which can be used include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). A number of useful commercial grades of different silicas are also available from Degussa Corporation (e.g., VN2, VN3), Rhone Poulenc (e.g., Zeosil® 1165 MP), and J. M. Huber Corporation.

To improve filler dispersion and reduce agglomeration and re-agglomeration of silica aggregates, a coupling agent may be used along with silica fillers. Typically, a silica coupling agent has at least two functional groups, one of which is reactive with the silica surface such as a silyl group, and another one can bind to the rubbery matrix such as mercapto, amino, vinyl, epoxy or sulfur group. Exemplary coupling agents include, but are not limited to, mercaptosilanes and organosilane polysulfides.

A silica dispersing aid such as monofunctional silica shielding agent may be used along with silica fillers. Examples of silica dispersing aids include silica hydrophobating agents that chemically react with the surface silanol groups on the silica particles but are not reactive with the matrix elastomer, and agents which physically shield the silanol groups to prevent reagglomeration (flocculation) of the silica particles after compounding. Specific examples of silica dispersing aid include alkyl alkoxysilanes, glycols (e.g., diethylene glycol or polyethylene glycol), fatty acid esters of hydrogenated and non-hydrogenated C$_5$ and C$_6$ sugars (e.g., sorbitan oleates, and the like), polyoxyethylene derivatives of the fatty acid esters, among others.

If used, silica may be present in the rubber compounds in an amount of from about 10 phr to about 150 phr, in another embodiment from about 20 phr to about 120 phr, and in a further embodiment from about 30 phr to about 100 phr.

In certain embodiments, a combination of silica and carbon black are utilized as reinforcing fillers in rubber compounds intended for use in various rubber products, including treads for tires.

Other fillers can also be utilized as processing aids. The filler include, but are not limited to, mineral fillers, such as aluminum silicate, calcium silicate, magnesium silicate, clay (hydrous aluminum silicate), talc (hydrous magnesium silicate), and mica as well as non-mineral fillers such as urea and sodium sulfate.

Oil can be included in the rubber compounds as a processing aid. Examples of suitable oils include aromatic, naphthenic, paraffinic processing oils, as well as combinations of the same. In one embodiment, the amount of oil may range from about 0 phr to about 150 phr, in another embodiment from about 10 phr to about 120 phr, and in yet another embodiment from about 15 phr to about 70 phr.

A vulcanizing agent is used to cure the rubber compounds of the invention. For a general disclosure of suitable vulcanizing agents, one can refer to Kirk-Othmer, *Encyclopedia of Chemical Technology*, 3$^{rd}$ ed., Wiley Interscience, N.Y. 1982, Vol. 20, pp. 365 to 468, particularly "Vulcanization Agents and Auxiliary Materials," pp. 390 to 402. Vulcanizing agents can be used alone or in combination. In preferred embodiments, sulfur or peroxide-based vulcanizing agent may be employed. Examples of suitable sulfur vulcanizing agents include "rubber maker's" soluble sulfur; elemental sulfur (free sulfur); sulfur donating vulcanizing agents such as organosilane polysulfides, amine disulfides, polymeric polysulfides or sulfur olefin adducts; and insoluble polymeric sulfur. In one embodiment, the sulfur vulcanizing agent is soluble sulfur or a mixture of soluble and insoluble polymeric sulfur.

The amount of vulcanizing agent, may range from about 0.1 phr to about 10 phr, in another embodiment from about 1 phr to about 5 phr, and in another embodiment from about 1 phr to about 3 phr.

A vulcanization accelerator may be used along with a vulcanizing agent. The vulcanization accelerators used in the present invention are not particularly limited. Examples of vulcanization accelerators include thiazol vulcanization accelerators, such as 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and the like; guanidine vulcanization accelerators, such as diphenylguanidine (DPG) and the like; amines; disulfides; thiurams; sulfenamides; dithiocarbamates; xanthates; and thioureas; among others.

The amount of vulcanization accelerator, if used, may range from about 0.1 phr to about 10 phr, in another embodiment from about 0.1 phr to about 5 phr, and in another embodiment about 0.1 phr to about 3 phr.

The composition may be compounded by methods generally known in the rubber compounding art, such as mixing the rubbery matrix polymer and the non-spherical polymeric nanoparticles with conventional amounts of commonly used additive materials such as, in addition to those identified above, for example, activators, retarders, other processing additives such as resins, and including tackifying resins, plasticizers, pigments, fatty acids, zinc oxide, waxes, antioxidants, anti-ozonants, and peptizing agents, using standard rubber mixing equipment and procedures.

A vulcanized rubber product may be produced by thermomechanically mixing rubbery matrix polymer, the nanoparticles, and various ingredients in a sequentially step-wise manner in a mixer, followed by shaping and curing the composition.

The composition of this invention can be used for various purposes. For example, it can be used for various rubber compounds, such as a tire treadstock, sidewall stock or other tire component stock compounds. Such tires can be built, shaped, molded and cured by various methods which are known and will be readily apparent to those having skill in such art. In one embodiment, a molded unvulcanized tire is placed into a vulcanizing mold and then vulcanized to produce a tire.

The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLES

In Examples 1-3, a 2-gallon reactor equipped with external heating jacket and internal agitation was used for all materials preparation. Styrene in hexane (33 weight percent styrene), hexane, butyllithium (1.54 M) and BHT were used as supplied. Isoprene (100% pure) was stored on aluminum oxide beads and calcium hydride under nitrogen. Technical grade divinyl benzene (80%, mixture of isomers, purchased from Aldrich, item 41,456-5) was stored on aluminum oxide beads and calcium hydride under nitrogen.

The di-lithium solution (~0.5M) was made according to the following procedure. To a clean, dry, $N_2$ purged closed bottle is charged equimolar amounts of triethyl amine and butyllithium. Then 1,3-diisopropenyl benzene is added at a target molar ratio of 1.2 to the sec-butyllithium. The bottle is then heated with agitation for 2.0 hours at 50° C.

For the following examples, sec-BuLi (57.14 ml, 1.4 M in cyclohexane, purchased from Aldrich) was added to a solution of 1,3-diisopropenylbenzene (6.84 ml, 40 mmol) and triethylamine (11.15 ml, 80 mmol) via a syringe at room temperature. The solution was agitated and heated at 50° C. for 2 hours. The deep red Li diadduct (abbreviated as DiLi, 0.53 M) was used as the di-lithium initiator and stored in freezer until use.

Example 1

The reactor was charged with 4 lbs. hexane and 0.373 lbs. isoprene (IP). The jacket of the reactor was heated to 135° F. When the batch reached 135° F., 15 ml of 0.5 M di-lithium solution was added. After 2 hours, 1.5 lb. styrene/hexane blend (containing 33 wt % styrene) was added to the reactor which was maintained at 135° F. An exothermic peak was observed after 20 minutes. After 2 hours, 50 ml divinylbenzene (DVB) was charged into the solution. The solution was allowed to react for an additional 2 hours, and then the reaction mixture was dropped into an isopropanol/acetone solution containing BHT (about 500 mL/2L). The solid was then filtered through a cheese-cloth and dried in vacuum. The product could be dissolved in a number of solvents, such as THF, toluene, and hexane. Those solutions were usually thick and gel-like, indicating that the synthesized polymer might have supra-architectures.

GPC analysis of the intermediate product, based on a polystyrene/THF standard, indicates block copolymer having a number average molecular weight (Mn) of 121K and a polydispersity (Mw/Mn) of 1.17. The block copolymer was designed as a triblock, in which the polystyrene block had a target Mn of 35K and the isoprene blocks had a target Mn of 25K. The TEM analysis was taken on a hexane solution of the final product at $10^{-5}$ wt % concentration. A drop of the diluted solution was coated on a carbon coated copper micro-grid. After the solvent was vaporized, the grid was stained with $RuO_4$ and was then examined by TEM (see FIG. 1). It was found that the product synthesized contained tree-like dendrites.

Example 2

In Example 2, the size of the isoprene block of the triblock polymers was decreased from a target Mn of 25K to 14K. The reactor was charged with 4 lbs. hexane and 0.229 lbs. isoprene. The jacket of the reactor was heated to 135° F. When the batch reached 135° F., 15 ml of 0.5 M di-lithium solution was added. After 2 hours, 1.5 lbs. styrene/Hexane blend (containing 33 wt % styrene) was added to the reactor which was maintained at 135° F. An exothermic peak was observed after 20 minutes. After 1.5 hours, the color of the solution was yellow. 50 ml divinyl benzene (DVB) was then charged into the solution. After about 7 minutes, the agitation was stopped. The solution was allowed to react for an additional 1.5 hours; the reaction mixture was then dropped into an isopropanol/acetone solution containing BHT (about 500 mL/2L). The solid was then filtered through a cheese-cloth and dried in vacuum.

Figure 2:
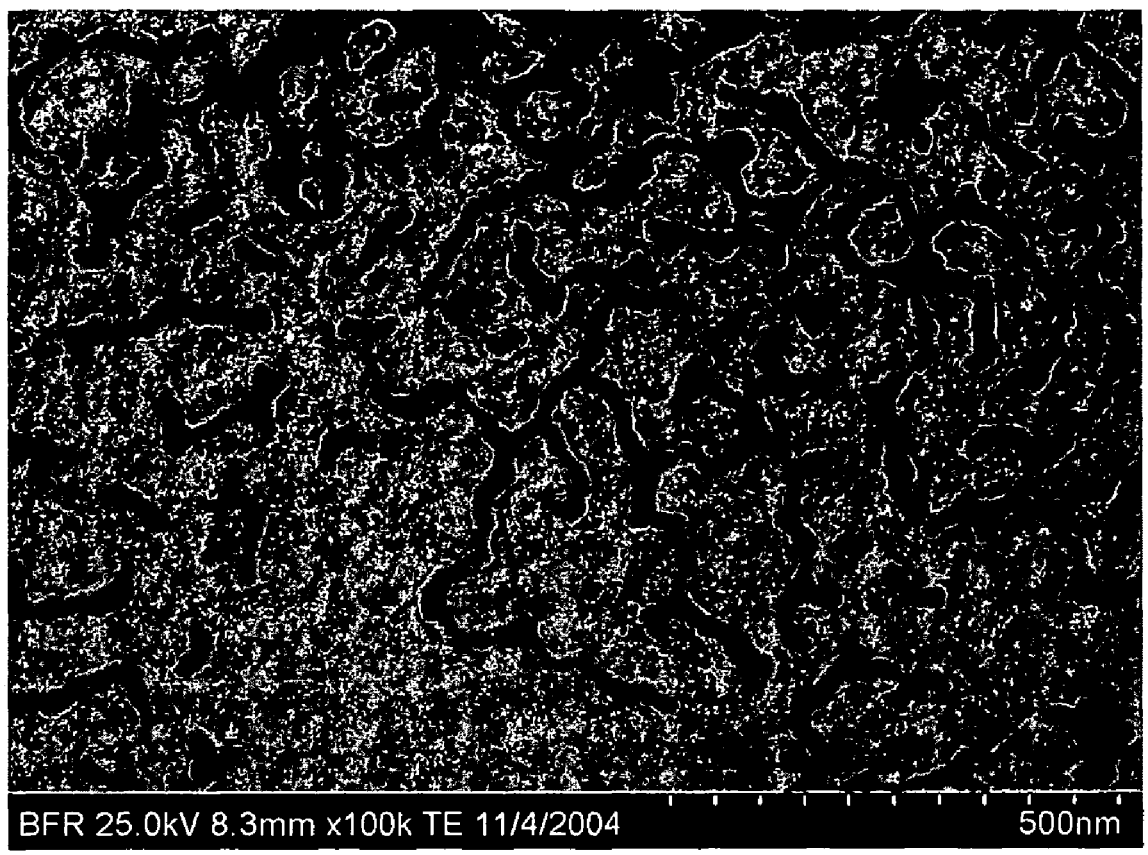
FIG. 2 is a transmission electron microscopy (TEM) photograph of polymer nanoparticles with controlled architecture of tree-like dendrite in an embodiment of the invention.

GPC analysis of the intermediate product, based on a polystyrene/THF standard, indicated block copolymer having a number average molecular weight (Mn) of 79, and a polydispersity (Mw/Mn) of 1.2. A TEM analysis of a hexane solution of the final product at $10^{-5}$ wt % concentration was conducted. A drop of the diluted solution was coated on a carbon coated copper micro-grid. After the solvent was vaporized, the grid was stained with $RuO_4$, and was then examined by TEM (see FIG. 2). The results showed that the product synthesized contained nano-rope structures.

Example 3

In Example 3, the size of the isoprene block of the triblock polymers was further decreased from a target Mn of 14K to 9K, and the nano-assembly of polymer chains changed to spherical particles with flower-like inner structures. The reactor was charged with 2 lbs. hexane and 0.195 lbs. isoprene. The jacket of the reactor was heated to 135° F. When the batch reached 135° F., 15 ml of 0.5 M di-lithium solution were added. After 2 hours, 1.5 lb. styrene/Hexane blend (containing 33 wt % styrene) were added to the reactor which was maintained at 135° F. An exothermic peak was observed after 20 minutes. After 2 hours, the color of solution was orange. 50 ml divnyl benzene (DVB) was then charged into the solution. The solution was allowed to react for an additional 2.5 hours. The reaction mixture was then dropped in an isopropanol/acetone solution containing BHT (about 500 mL/2 L). The solid was then filtered through cheesecloth and dried in vacuum.

Figure 3:
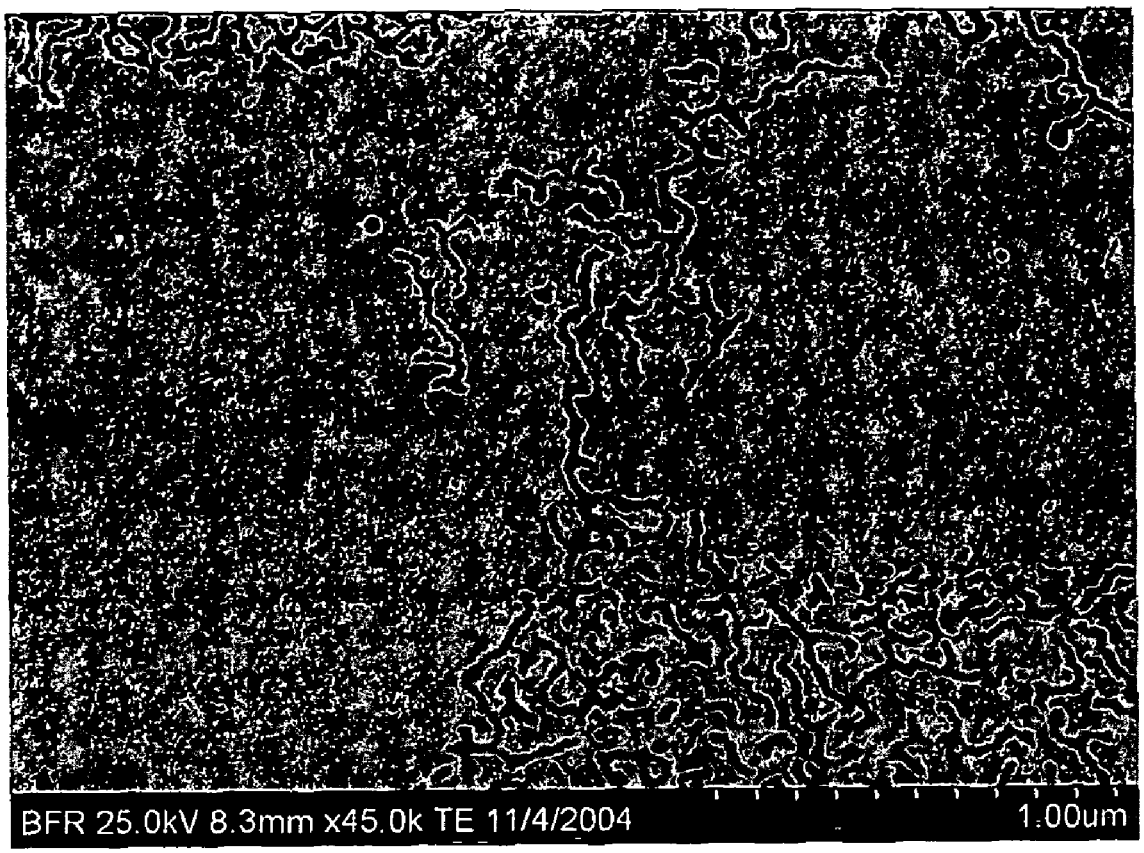
FIG. 3 is a TEM photograph of polymer nanoparticles with controlled architecture of nano-rope in an embodiment of the invention.
Figure 4:
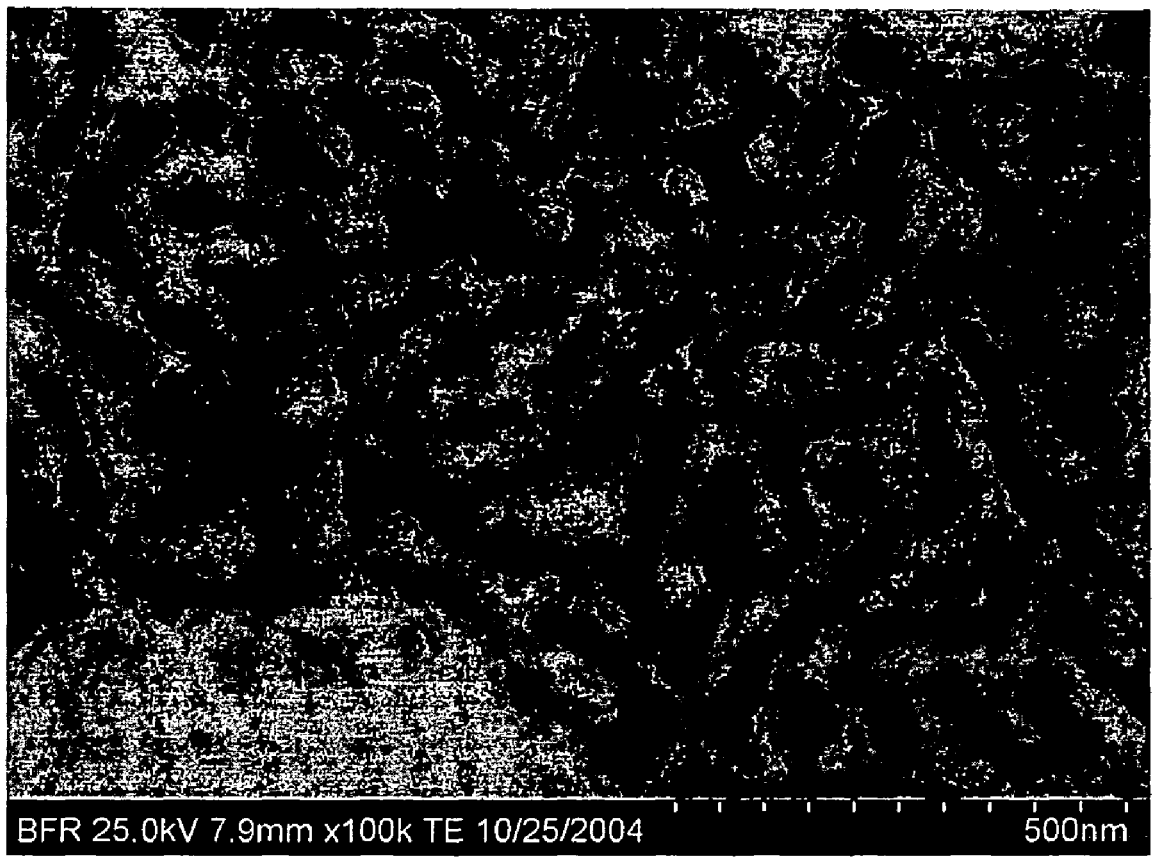
FIG. 4 is a TEM photograph of polymer nanoparticles with controlled architecture of nano-sphere with flower-like inner structure in an embodiment of the invention.

GPC analysis of the intermediate product, based on a polystyrene/THF standard, indicated block copolymer having a number average molecular weight (Mn) of 58K and a polydispersity (MW/Mn) of 1.03. The TEM analysis was taken on a hexane solution of the final product at $10^{-5}$ wt % concentration. A drop of the diluted solution was coated on a carbon coated copper micro-grid. After the solvent was vaporized, the grid was stained with $RuO_4$ and was then examined by TEM (see FIG. 3). The results showed that the product synthesized contained spherical particles with flower-like inner structures.

In Examples 4-7, a 2-gallon reactor equipped with external jacked heating and internal agitation was used for all material preparation. Styrene in hexane (33 weight percent styrene), hexane, butyllithium (BuLi, 1.6 M) and BHT were used as supplied. Isoprene (100% pure) was stored on aluminum oxide beads and calcium hydride under nitrogen. Technical grade divinylbenzene (80%, mixture of isomers, purchased from Aldrich, item 41,456-5) was stored on aluminum oxide beads and calcium hydride under nitrogen. The di-lithium solution (~0.5M) was made according to the method described above.

Example 4

The reactor was charged with 4 lbs. hexane and 0.231 lbs. isoprene. The jacket of the reactor was heated to 135° F. When the batch reached 135° F., 7.5 ml of 0.5 M di-lithium solution and 2.4 ml of 1.6 M BuLi were added. After 2 hours, 1.5 lbs. styrene/hexane blend (containing 33 wt % styrene) was added to the reactor that was maintained at 135° F. An exothermic peak was observed after 20 minutes. After 1.5 hours, 50 ml divinyl benzene (DVB) was charged into the solution. The solution was allowed to react for an additional 1.5 hours, and then the reaction mixture was dropped in an isopropanol/acetone solution containing BHT (about 500 mL/2 L). The solid was then filtered through a cheese cloth and dried in vacuum.

Figure 5:
FIG. 5 is a TEM photograph of polymer nanoparticles with architecture of sphere, chain, dumbbell and other irregular structures in an embodiment of the invention.

A drop of the diluted solution was coated on a carbon coated copper micro-grid. After the solvent was vaporized, the grid was stained with $RuO_4$ and was then examined by TEM. As shown in FIG. 5, the product synthesized contained spheres, chains, dumbbells and other irregular structures.

Example 5

In Example 5, the size of the isoprene block of the triblock polymers was increased over that of Example 4. The reactor was initially charged with 4 lbs. hexane and 0.31 lbs. isoprene. The synthesis process and the charge of other components was the same as that described in Example 4.

Figure 6:
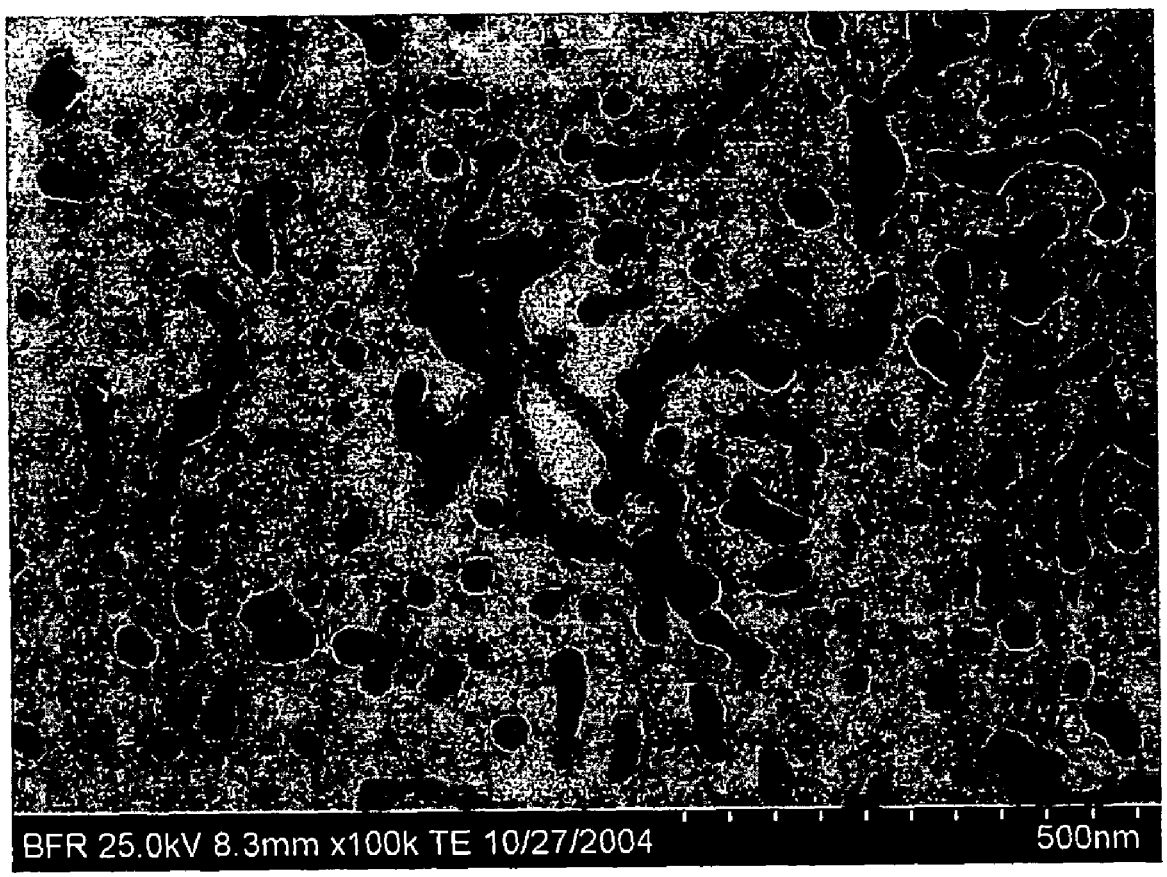
FIG. 6 is a TEM photograph of polymer nanoparticles with architecture of short nano-ropes in an embodiment of the invention.

A TEM analysis was performed on a hexane solution of the final product at $10^{-5}$ wt % concentration. A drop of the diluted solution was coated on a carbon coated copper micro-grid. After the solvent was vaporized, the grid was stained with $RuO_4$ and was then examined by TEM. As shown in FIG. 6, the product synthesized contained short nano-ropes.

Example 6

In Example 6, the size of the isoprene block of the triblock polymer was reduced, resulting in the formation of nano branches. The reactor was charged with 4 lbs. hexane and 0.185 lbs. isoprene. The jacket of the reactor was heated to 135° F. When the batch reached 135° F., 7.5 ml of 0.5 M dilithium solution and 2.4 ml of 1.6 M BuLi were added. After 2 hours, 1.5 lbs. styrene/Hexane blend (containing 33 wt % styrene) was added to the reactor that was maintained at 135° F. An exothermic peak was observed after 20 minutes. After 1.5 hours, the color of solution was orange. 50 ml divinyl-benzene (DVB) was then charged into the solution. The solution was allowed to react for an additional 1.5 hours; and the reaction mixture was then dropped in an isopropanol/acetone solution containing BHT (about 500 mL/2 L). The solid was then filtered through a cheese cloth and dried in vacuum.

Figure 7:
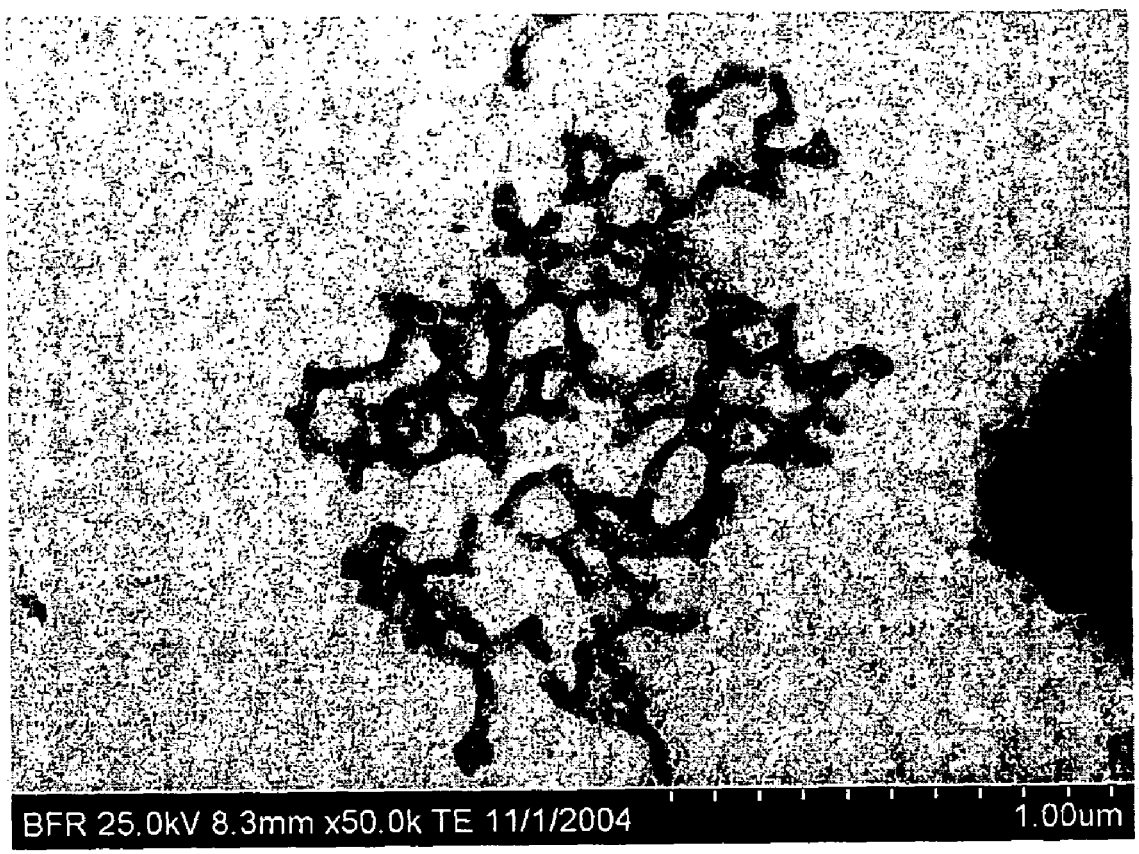
FIG. 7 is a TEM photograph of polymer nanoparticles with architecture of short nano-sized branches in an embodiment of the invention.
Figure 8:
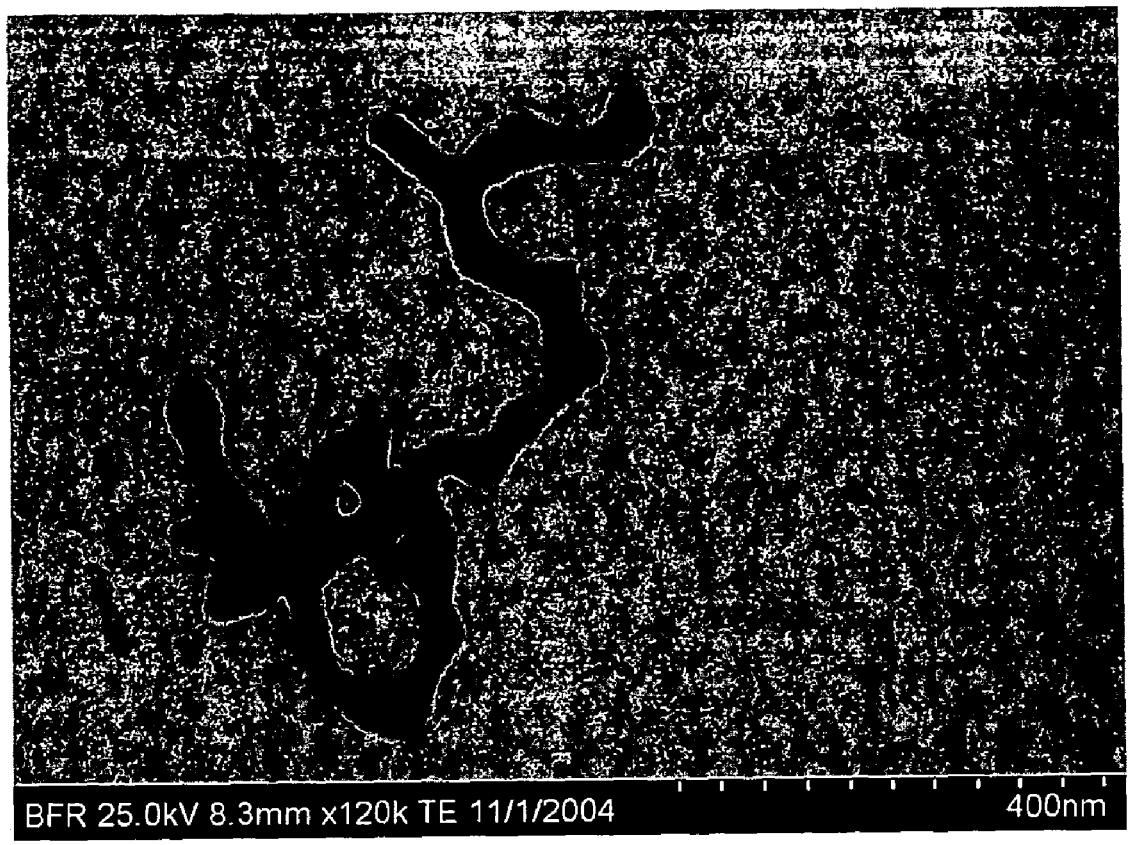
FIG. 8 is a TEM photograph of polymer nanoparticles with architecture of short nano-sized branch in an embodiment of the invention.

A TEM analysis was conducted on a hexane solution of the final product at $10^{-5}$ wt % concentration. A drop of the diluted solution was coated on a carbon coated copper micro-grid. After the solvent was vaporized, the grid was stained with $RuO_4$ and was then examined by TEM. As shown in FIG. 7, the product contained short nano-sized branches. One of the branches looked somewhat rigid (see FIG. 8) and appeared to stretch out in three dimensions.

Example 7

By adjusting types and amounts of materials added to the reactor, a product with an architecture of narrowly distributed nano-branches was formed. The reactor was charged with 4 lbs. hexane and 1.15 lbs. Butadiene/Hexane solution (21.4% Butadiene). The jacket of the reactor was heated to 135° F. When the batch reached 135° F., 10 ml of 0.5 M dilithium solution and 1 ml of 1.6 M BuLi were added. After 2 hours, 1.5 lbs. styrene/Hexane blend (containing 33 wt % styrene) were added to the reactor that was maintained at 135° F. An exothermic peak was observed after 20 minutes. After 1.5 hours, 50 ml divinyl-benzene (DVB) was then charged into the solution. The solution was allowed to react for an additional 1.5 hours; and the reaction mixture was then dropped in an isopropanol/acetone solution containing BHT (about 500 mL/2 L). The solid was then filtered through a cheese cloth and dried in vacuum.

Figure 9:
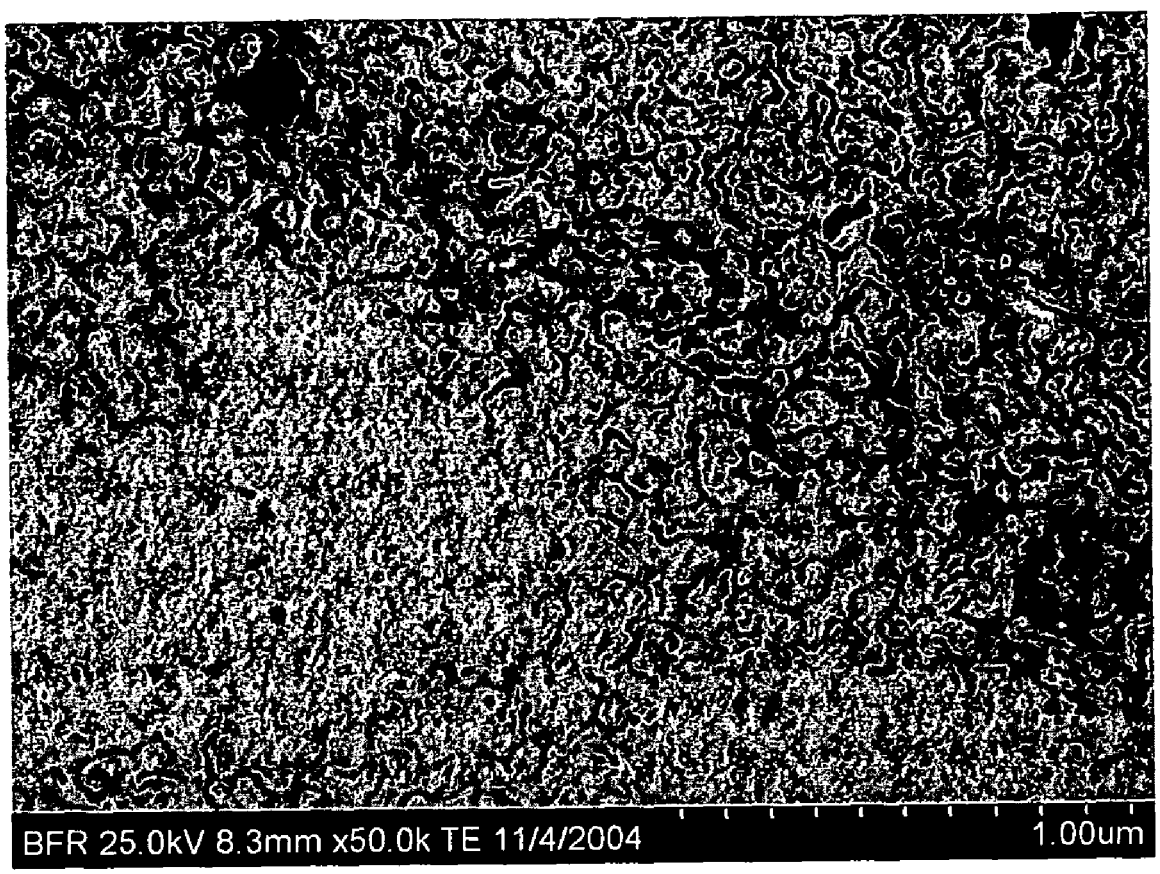
FIG. 9 is a TEM photograph of polymer nanoparticles with architecture of narrowly distributed nano-sized branches in an embodiment of the invention.
Figure 10:
FIG. 10 is a TEM photograph of polymer nanoparticles with architecture of narrowly distributed nano-sized branches in an embodiment of the invention.

A TEM analysis was conducted on a hexane solution of the final product at $10^{-5}$ wt % concentration. A drop of the diluted solution was coated on a carbon coated copper micro-grid. After the solvent was vaporized, the grid was stained with $RuO_4$ and was then examined by TEM. As shown in FIGS. 9 and 10, the product contained narrowly distributed nano-sized branches.

Examples 8, 9 and 10

Application of the Nano-Branches in a Rubber Formulation

Three rubber compositions were prepared according to the formulation shown in Tables 1 and 2 by selectively using the nanoparticles of Examples 6 and 7 to replace 10 phr of SBR in the compound formulation (i.e., Examples 9 and 10).

In each sample, the ingredients were mixed according to the method of Table 3. The final stocks were sheeted and cured at 165° C. for 15 minutes.

TABLE 1

| Composition for Mater Batch (in phr) | | | |
|---|---|---|---|
|  | Ex. 8 | Ex. 9 | Ex. 10 |
| SBR | 100.00 | 90.00 | 90.00 |
| Example 6 (nanoparticles) | 0 | 10.00 | 0 |
| Example 7 (nanoparticles) | 0 | 0 | 10.00 |
| Carbon Black (N343) | 50.00 | 50.00 | 50.00 |
| Aromatic Oil | 15.00 | 15.00 | 15.00 |
| Zinc Oxide | 3.00 | 3.00 | 3.00 |
| Hydrocarbon Resin (tackifiers) | 2.00 | 3.00 | 3.00 |
| Antioxidant | 0.95 | 0.95 | 0.95 |
| Stearic Acid | 2.00 | 2.00 | 2.00 |
| Wax | 1.00 | 1.00 | 1.00 |

TABLE 2

| Composition for Final Batch (in phr) | | | |
|---|---|---|---|
| Sulphur | ~1.30 | ~1.30 | ~1.30 |
| Cyclohexyl-benzothiazole Sulfonamide (accelerator) | 1.40 | 1.40 | 1.40 |
| Diphenylguanidine (accelerator) | 0.20 | 0.20 | 0.20 |

TABLE 3

| Mixing Conditions. Mixer: 300 g Brabender Agitation Speed: 60 rpm | | |
|---|---|---|
| Mater Batch Stage Initial Temperature 110° C. | | |
| 0 min | charging polymers | |
| 0.5 min | charging oil and Carbon Black | |
| 5.0 min | drop | |
| Final Batch Stage Initial Temperature 75° C. | | |
| 0 sec | charging master stock | |
| 30 sec | charging curing agent and accelerators | |
| 75 sec | drop | |

The results of the analysis of the vulcanized rubber compounds of Examples 8-10 are shown in Table 4. Measurement of tensile strength was based on conditions of ASTM-D 412 at 22° C. Test specimen geometry was taken the form of a ring of a width of 0.05 inches and of a thickness of 0.075 inches. The specimen was tested at a specific gauge length of 1.0 inch. The measurement of tear strength was based on conditions of ASTM-D 624 at 170° C. Test specimen geometry was taken the form of a nicked ring (ASTM-624-C). The specimen was tested at the specific gauge length of 1.750 inches. The hysteresis loss was measured with a Dynastat Viscoelastic Analyzer. Test specimen geometry was taken the form of a cylinder of a length of 15 mm and of a diameter of 10 mm. The following testing conditions were employed: frequency 1 Hz, 2 kg static load and 1.25 kg dynamic load.

TABLE 4

| | Ex. 8 | Ex. 9 | Ex. 10 |
|---|---|---|---|
| 130° C. ML4 | 36.38 | 39 | 41.8 |
| MDR 2000 165° C. MH | 13.17 | 13.22 | 13.61 |
| T90 | 5.6 | 5.94 | 5.76 |
| Shore A 22c (3 sec) | 55.4 | 64.3 | 62.2 |
| 100° C. (3 sec) | 53.5 | 57.4 | 56.4 |
| Ring Tensile at 23° C. | | | |
| Tb(MPa) | 16.73 | 16.44 | 18.85 |
| Eb (%) | 548.4 | 502.9 | 523.2 |
| M300 | 7.07 | 8.6 | 9.25 |
| M50 | 0.93 | 1.25 | 1.25 |
| Ring Tensile at 100° C. | | | |
| Tb(MPa) | 8.36 | 8.5 | 8.54 |
| Eb (%) | 377.8 | 366.6 | 352 |
| M300 | 5.94 | 6.42 | 6.81 |
| M50 | 0.69 | 0.8 | 0.78 |
| Tear Strength (kN/m) | 16.7 | 17.1 | 18.0 |
| Ring Tear travel (%) 170° C. | 410 | 410 | 395 |
| Tg of Compound (from tan delta) | −42 | −42 | −42 |
| Stanley London (concrete) | 56.2 | 57 | 52.6 |
| Dynstat tan delta at 50° C. | 0.1906 | 0.2351 | 0.2195 |
| K′(lbf/in) | 141.14 | 241.16 | 203.38 |
| Tan delta 25° C. | 0.2311 | 0.2600 | 0.2539 |
| K′(lbf/in) | 178.13 | 385.19 | 277.32 |

TABLE 4-continued

| | Ex. 8 | Ex. 9 | Ex. 10 |
|---|---|---|---|
| Tan delta 0° C. | 0.2571 | 0.2528 | 0.2567 |
| K′(lbf/in) | 259.02 | 639.71 | 494.91 |
| Tan delta −20° C. | 0.2967 | 0.2838 | 0.3269 |
| K′(lbf/in) | 374.23 | 890.85 | 689.54 |

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

The invention claimed is:

1. A polymeric nanoparticle composition, the nanoparticles comprising a core and one or more shell layers, wherein the core comprises a cross-linked multi-vinyl substituted aromatic hydrocarbon, and the shell layers comprise at least one of a conjugated diene layer and a vinyl aromatic hydrocarbon layer, wherein the nanoparticle comprises triblock copolymers in a looped or extended conformation; and wherein a majority of the nanoparticles of the composition have an elongated shape.

2. The polymeric nanoparticle composition of claim 1, wherein a majority of the nanoparticles are is in the shape of a dendrite structure comprising both longer and shorter branches.

3. The polymeric nanoparticle of claim 1, wherein the nanoparticle is in the shape of a nano-branch.

4. Core-shell polymeric nanoparticles made from triblock copolymers comprising Block α, Block β, and Block γ as represented by the following formula (I):

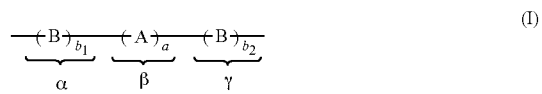

in which A comprises a conjugated diene monomer; B comprises a vinyl aromatic monomer; a is an integer of from about 10 to about 1000K; $b_1 \approx b_2$ and each of them is an integer of from about 10 to about 1000K, wherein a majority of the nanoparticles have an elongated shape, and a crosslinked core.

5. Polymeric nanoparticles according to claim 4, in which the conjugated diene monomer comprises a conjugated 1,3-diene monomer represented by the formula (II) as shown below:

Formula (II)

in which $R_5$, $R_6$, $R_7$, and $R_8$ are each independently selected from the group consisting of hydrogen, methyl, ethyl, propyl, and isopropyl.

6. Polymeric nanoparticles according to claim 5, in which the conjugated diene monomer comprises a $C_4$-$C_8$ conjugated diene monomer.

7. Polymeric nanoparticles according to claim 4, in which the conjugated diene monomer is selected from the group consisting of 1,3-butadiene, isoprene (2-methyl-1,3-butadiene), cis- and trans-piperylene (1,3-pentadiene), 2,3-dimethyl-1,3-butadiene, 1,3-pentadiene, cis- and trans-1,3-hexadiene, cis- and trans-2-methyl-1,3-pentadiene, cis- and trans-3-methyl-1,3-pentadiene, 4-methyl-1,3-pentadiene, 2,4-dimethyl-1,3-pentadiene, and the mixture thereof.

8. Polymeric nanoparticles according to claim 4, in which the vinyl aromatic monomers is selected from the group consisting of styrene, α-methyl-styrene, 1-vinyl naphthalene, 2-vinyl naphthalene, vinyl toluene, methoxystyrene, t-butoxystyrene; as well as alkyl, cycloalkyl, aryl, alkaryl, and aralkyl derivatives thereof, in which the total number of carbon atoms in the monomer is generally not greater than about 18; and mixtures thereof.

9. Polymeric nanoparticles according to claim 4, in which the triblock copolymer chains are crosslinked with a multiple-vinyl-substituted aromatic hydrocarbon.

10. Polymeric nanoparticles according to claim 9, in which the multiple-vinyl-substituted aromatic hydrocarbon has a formula as shown below:

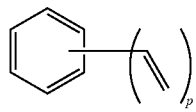

in which p is an integer and $2 \leq p \leq 6$.

11. Polymeric nanoparticles according to claim 9, in which the multiple-vinyl-substituted aromatic hydrocarbon comprises di-vinyl-benzene (DVB) selected from any one of the following isomers or any combination thereof:

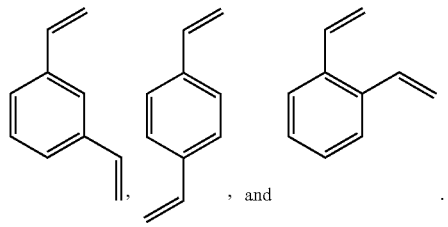
, and .

12. Polymeric nanoparticles according to claim 4, wherein the nanoparticles are made from a mixture comprising triblock copolymers and diblock copolymers.

13. Polymeric nanoparticles according to claim 12, wherein the diblock copolymers comprise a conjugated diene block and a vinyl aromatic hydrocarbon block.

14. A rubber composition comprising a rubber matrix and the polymeric nanoparticles of claim 1.

15. A rubber composition comprising a rubber matrix and the polymeric nanoparticles of claim 4.

16. The polymeric nanoparticles of claim 1 incorporated into a tire.

17. A rubber article comprising the rubber composition of claim 14, and wherein the rubber composition is vulcanized.

18. The rubber article according to claim 17, which is a tire.

19. The core-shell polymeric nanoparticles of claim 4, wherein the number average molecular weight ($Mn_\beta$) of Block β is about 19.5K to about 35K.

20. The core-shell polymeric nanoparticles of claim 4, wherein the number average molecular weight ($Mn_\beta$) of Block β is about 11.5K to about 19.5K.

21. The core-shell polymeric nanoparticles of claim 4, wherein the number average molecular weight ($Mn_\beta$) of Block β is about 5K to about 11.5K.

22. The core-shell polymeric nanoparticles of claim 4, wherein the number average molecular weight ($Mn_\beta$) of Block β is about 3K to about 100K.

23. The core-shell polymeric nanoparticles of claim 4, further comprising the residue of a di-lithium initiator.

24. The polymeric nanoparticle of claim 1, further comprising the residue of a di-lithium initiator.

25. A rubber composition comprising nanoparticles and rubber, the nanoparticles comprising a core and one or more shell layers, wherein the core comprises a cross-linked multivinyl substituted aromatic hydrocarbon, and the shell layers comprise at least one of a conjugated diene layer and a vinyl aromatic hydrocarbon layer, wherein the nanoparticle comprises triblock copolymers, wherein a majority of the nanoparticles have a non-spherical shape, and the nanoparticle comprises a residue of a di-lithium initiator.

* * * * *